(12) United States Patent
Matsumura et al.

(10) Patent No.: US 11,375,481 B2
(45) Date of Patent: Jun. 28, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,993

(22) PCT Filed: Feb. 2, 2018

(86) PCT No.: PCT/JP2018/003546
§ 371 (c)(1),
(2) Date: Aug. 1, 2019

(87) PCT Pub. No.: WO2018/143395
PCT Pub. Date: Aug. 9, 2018

(65) Prior Publication Data
US 2020/0015225 A1 Jan. 9, 2020

(30) Foreign Application Priority Data
Feb. 2, 2017 (JP) .............................. JP2017-017975

(51) Int. Cl.
*H04W 72/04* (2009.01)
*H04B 1/713* (2011.01)
(Continued)

(52) U.S. Cl.
CPC ........ *H04W 72/0413* (2013.01); *H04B 1/713* (2013.01); *H04L 5/0051* (2013.01); *H04L 5/10* (2013.01); *H04L 27/2607* (2013.01)

(58) Field of Classification Search
CPC .................................................. H04W 72/0413
See application file for complete search history.

(56) References Cited

U.S. PATENT DOCUMENTS

2008/0232432 A1* 9/2008 Lee ..................... H04L 27/2607
375/140
2009/0010240 A1* 1/2009 Papasakellariou .... H04L 5/0053
370/344
(Continued)

FOREIGN PATENT DOCUMENTS

| EP | 3297357 A1 | 3/2018 |
|---|---|---|
| JP | H10-107696 A | 4/1998 |
| WO | 2016182063 A1 | 11/2016 |

OTHER PUBLICATIONS

3GPP TSG RAN WG1 Meeting #87 R1-1611470 Nov. 2016 Discussion on sPUCCH design for sTTI ZTE (Year: 2016).*
(Continued)

*Primary Examiner* — Kevin M Cunningham
(74) *Attorney, Agent, or Firm* — Osha Bergman Watanabe & Burton LLP

(57) ABSTRACT

A terminal is disclosed that includes a transmitter that transmits uplink control information on an uplink control channel and a processor that uses, in the transmission of the uplink control information, one of a first uplink control channel format or a second uplink control channel format based on a number of bits of the uplink control information. The first uplink control channel format uses a cyclic shift that depends on the uplink control information, and the second uplink control channel format is used for transmission of the uplink control information and a demodulation reference signal.

7 Claims, 32 Drawing Sheets

(51) Int. Cl.
*H04L 5/00* (2006.01)
*H04L 5/10* (2006.01)
*H04L 27/26* (2006.01)

(56) References Cited

U.S. PATENT DOCUMENTS

2018/0124815 A1* 5/2018 Papasakellariou .... H04L 5/0053
2018/0198568 A1 7/2018 Takeda et al.
2018/0331807 A1* 11/2018 Kim ..................... H04L 29/06

OTHER PUBLICATIONS

3GPP TSG RAN WG1 Meeting #87 Reno USA, Nov 14-18, 2016 R1-1611160 "Discussion on sPUCCH design" Huawei (Year: 2016).*
3GPP TSG RAN WG1 NR Ad-Hoc Meeting; R1-1700364 "UL control channel design with short duration" Intel Corporation; Spokane, USA; Jan. 16-20, 2017 (6 pages).
Office Action issued in Japanese Application No. 2018-566113; dated May 8, 2020 (9 pages).
International Search Report issued in PCT/JP2018/003546 dated Mar. 20, 2018 (4 Pages).
Written Opinion of the International Searching Authority issued in PCT/JP2018/003546 dated Mar. 20, 2018 (4 Pages).
Nokia et al.; "On the design of long PUCCH for NR"; 3GPP TSG RAN WG1#NR, R1-1701014; Spokane, WA, USA, Jan. 16-20, 2017 (3 Pages).
Intel Corporation; "Link level evaluation and comparison of sequence vs. DM-RS based structures for short UL control channel"; 3GPP TSG RAN WG1 NR Ad-Hoc Meeting, R1-1700367; Spokane, USA, Jan. 16-20, 2017 (6 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
Nozomu NISHINAGA et. al.; "M-Ary Orthogonal Keying under Carrier Frequency Offset"; IEICE Trans. Fundamentals, vol. E79-A, No. 9, Sep. 1996 (8 Pages).
3GPP TSG RAN WG1 Meeting #86; R1-166860 "sPUCCH design for HARQ-ACK feedback with shortened TTI length" LG Electronics; Gothenburg, Sweden; Aug. 22-26, 2016 (7 pages).
Extended European Search Report issued in European Application No. 18748743.4, dated Nov. 2, 2020 (7 pages).
Office Action issued in Indian Application No. 201937031218, dated Dec. 16, 2021 (5 pages).
Office Action issued in European Application No. 18748743.4, dated Jan. 5, 2022 (6 pages).

* cited by examiner

| NUMBER OF PUCCH SYMBOLS | NUMBER OF PUCCH SYMBOLS |
|---|---|
| 2 | 323 |
| 4 | 442 |
| 12 | 586 |
| 14 | 605 |

FIG. 4

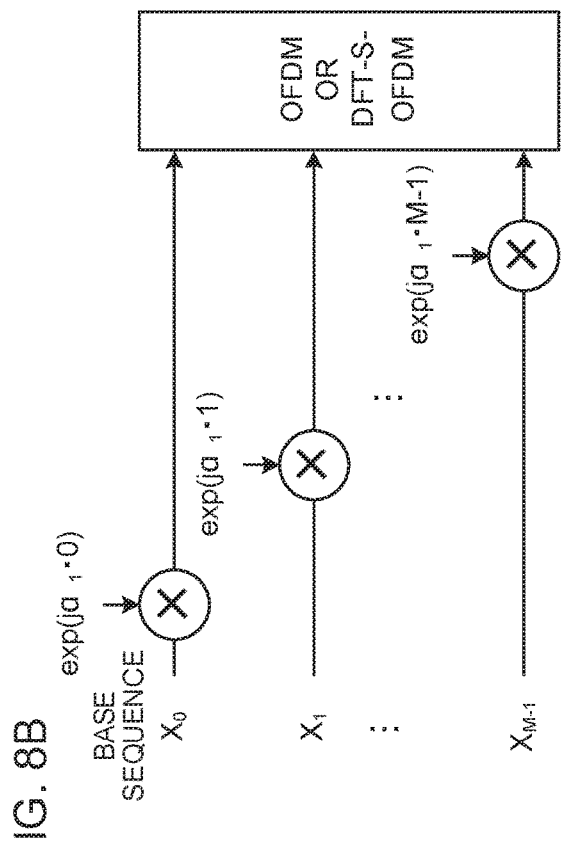
FIG. 8A
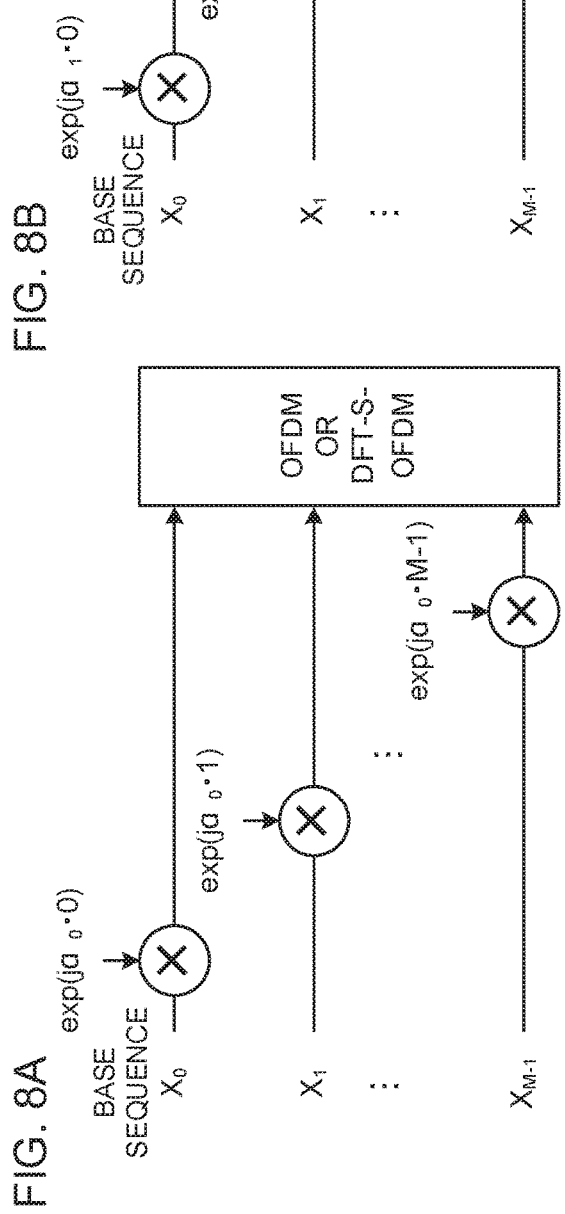
FIG. 8B
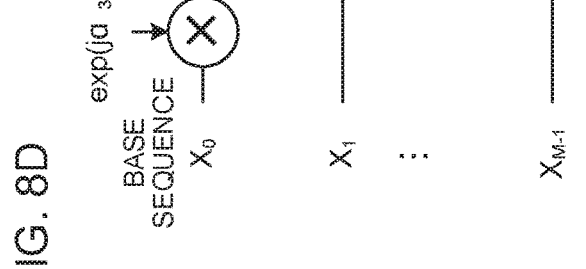
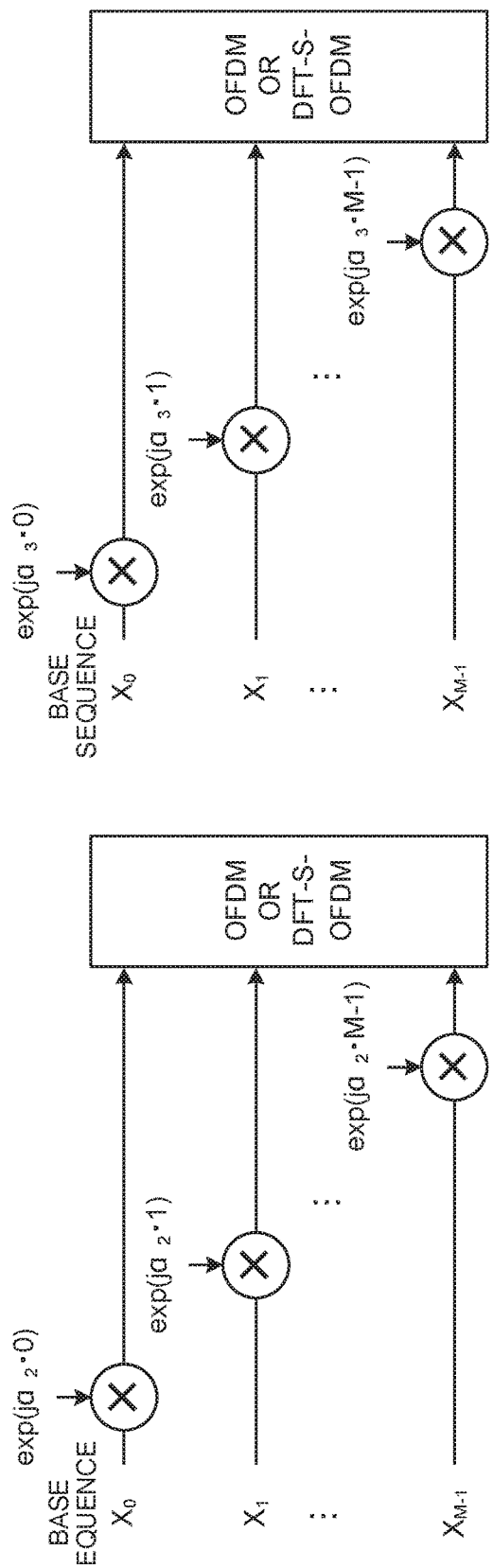
FIG. 8C
FIG. 8D

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control Channel)) and/or a UL data channel (for example, PUSCH (Physical Uplink Shared Channel)). The format of this UL control channel is referred to as "PUCCH format" and so on.

UCI contains at least one of a scheduling request (SR), retransmission control information in response to DL data (DL data channel (PDSCH (Physical Downlink Shared CHannel))) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Future radio communication systems (for example, 5G, NR, etc.) are expected to realize various radio communication services so as to fulfill mutually varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, in LTE/NR, studies are underway to use UL control channels of various formats (UL control channel formats). When applying UCC transmission methods in existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a user terminal and a radio communication method, whereby UL control information can be reported properly in future radio communication systems.

A user terminal according to one aspect of the present invention has a control section that controls mapping of a UL signal, which is generated by using a spreading code resource that is associated with the value of UL control information, to a plurality of time resources, and a transmission section that transmits the UL signal.

Advantageous Effects of Invention

According to the present invention, UL control information can be reported properly in future radio communication systems.

BRIEF DESCRIPTION OF DRAWINGS

FIG. 4 is a diagram to show examples of results of link budget calculation;

FIGS. 8A to 8D are diagrams to show examples of processes of generating sequence-based PUCCH transmission signals;

DESCRIPTION OF EMBODIMENTS

Figure 1A:
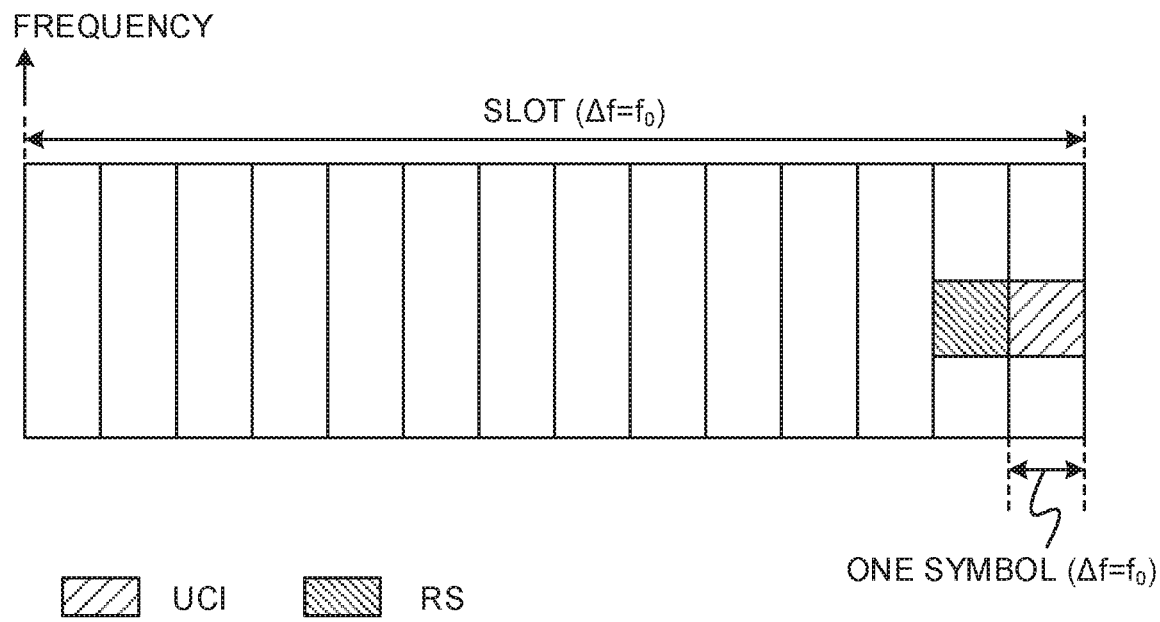
FIGS. 1A and 1B are diagrams, each showing an example of a short PUCCH format in future radio communication systems.

Future radio communication systems (for example, LTE Rel. 14, 15 and/or later versions, 5G, NR, etc.) are under study to introduce multiple numerologies, not a single numerology.

Note that numerology may refer to a set of communication parameters that characterize the design of signals in a given RAT (Radio Access Technology), the design of the RAT and so on, or refer to parameters that relate to the frequency direction and/or the time direction, such as subcarrier spacing (SCS), symbol duration, cyclic prefix duration, subframe duration and so on.

Also, future radio communication systems are being studied to introduce time units (also referred to as "subframes," "slots," "mini slots," "subslots," "transmission time intervals (TTIs)," "short TTIs," "radio frames" and so on) that are the same and/or different than existing LTE systems (LTE Rel. 13 or earlier versions), while supporting multiple numerologies and so on.

Note that TTIs may represent time units in which transport blocks, code blocks and/or codewords of transmitting/receiving data are transmitted and received. When a TTI is provided, the period of time (for example, the number of symbols) where a transport block, a code block and/or a codeword of data is actually mapped may be shorter than the TTI.

For example, when a given number of symbols (for example, fourteen symbols) constitute a TTI, transmitting/receiving data's transport block, code block and/or codeword can be transmitted and received in a period of one or a given number of symbols in the constituent symbols. If the number of symbols in which a transport block, a code block and/or a codeword of transmitting/receiving data is transmitted and/or received is smaller than the number of symbols constituting a TTI, reference signals, control signals and/or others can be mapped to symbols in the TTI where no data is mapped.

Subframes may serve as time units that have a given time duration (for example, 1 ms), irrespective of which numerology is used by (and/or configured in) a user terminal (for example, UE (User Equipment)).

By contrast with this, slots may serve as time units that depend on the numerology UE uses. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may contain a plurality of minislots (subslots).

Generally, subcarrier spacing and symbol duration hold a reciprocal relationship. Therefore, as long as the number of symbols per slot (or minis lot (subslot)) is the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than PUCCH (Physical Uplink Control CHannel) formats for existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a given number of symbols (for example, one symbol or two symbols) of a given SCS. In this short PUCCH, uplink control information (UCI) and reference signals (RSs) may be time-division-multiplexed (TDM) or frequency-division-multiplexed (FDM). The RSs may be, for example, the demodulation reference signal (DMRS), which is used to demodulate UCI.

The SCS for each symbol of the short PUCCH may be the same as or higher than the SCS for symbols of data channels (hereinafter also referred to as "data symbols"). The data channels may be, for example, a downlink data channel (PDSCH (Physical Downlink Shared CHannel)), an uplink data channel (PUCCH (Physical Uplink Shared CHannel)) and so on.

A short PUCCH may be referred to as a "PUCCH with a higher (bigger, wider, etc.) SCS" (for example, 60 kHz). Note that the time unit in which one short PUCCH is transmitted may be referred to as a "short TTI."

In a short PUCCH, a multicarrier waveform (for example, a waveform based on cyclic prefix OFDM (CP-OFDM (Cyclic Prefix Orthogonal Frequency Division Multiplexing))) may be used, or a single-carrier waveform (for example, a waveform based on DFT-S-OFDM (Discrete Fourier Transform Spread Orthogonal Frequency Division Multiplexing)) may be used.

Note that the waveform may be referred to as "communication scheme," "multiplexing scheme," "modulation scheme," "access scheme," "waveform scheme," and so on. Also, these waveforms may be characterized based on whether or not DFT precoding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." Furthermore, "waveform" may also be referred to as "waveform signal," "signal in accordance with waveform," "waveform of signal," "signal," and so on.

Figure 1B:
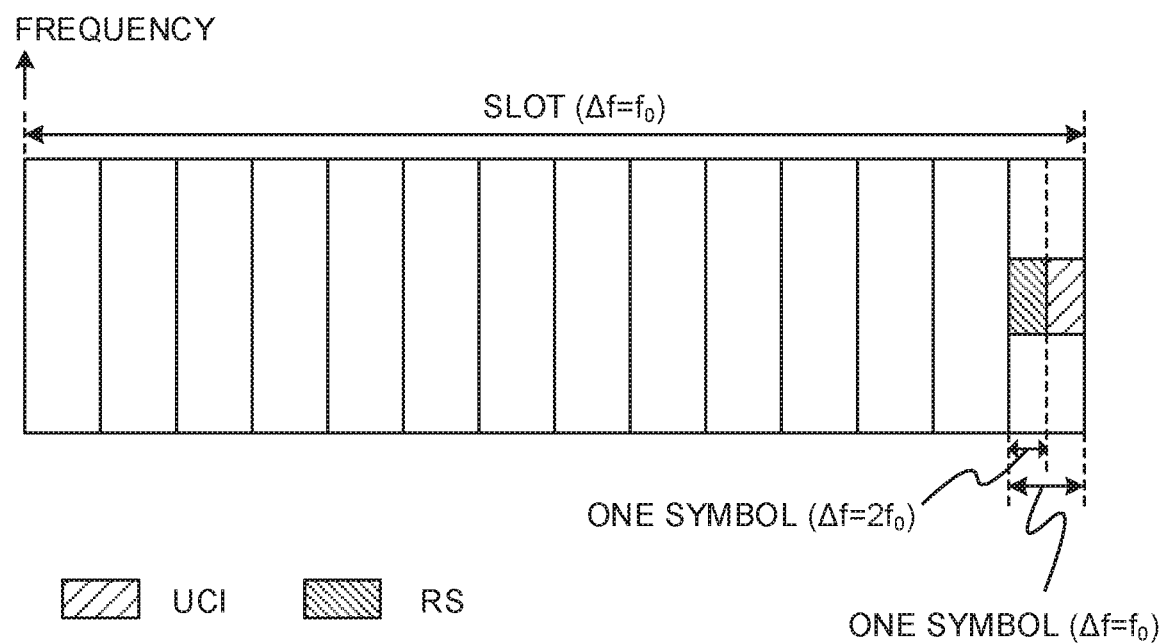

FIGS. 1A and 1B are diagrams, each showing an example of a short PUCCH format for use in future radio communication systems. In these examples, one slot is formed with fourteen symbols, each having a subcarrier spacing of $\Delta f = f_0$ (for example, 15 kHz), but the number of symbols to be contained in one slot is by no means limited to this.

In FIGS. 1A and 1B, a short PUCCH is placed (mapped) in a given number of symbols (here, one symbol or two symbols) from the end of the slot. In addition, a short PUCCH is placed in one or more frequency resources (for example, one or more physical resource blocks (PRBs)).

As shown in FIG. 1A, in a short PUCCH, UCI and an RS may be time-division-multiplexed (TDM) in a plurality of symbols. In this short PUCCH, UCI and an RS are placed in different symbols. A multicarrier waveform (for example, the OFDM waveform) or a single-carrier waveform (for example, the DFT-S-OFDM waveform) can be applied to this short PUCCH.

Meanwhile, as shown in FIG. 1B, in a short PUCCH, UCI and an RS may be time-division-multiplexed (TDM) over a plurality of symbols having a higher SCS (for example, $2 f_0$) than the SCS ($= f_0$) constituting the slot. In this case, within one symbol (which may be referred to as, for example, a "long symbol") in the slot, multiple symbols (which may be referred to as, for example, "short symbols") with a higher SCS can be placed. In this short PUCCH, UCI and an RS are placed in different short symbols. A multicarrier waveform (for example, the OFDM waveform) or a single-carrier waveform (for example, the DFT-S-OFDM) can be applied to this short PUCCH.

Also, in one or more symbols in a short PUCCH, UCI and an RS may be frequency-division-multiplexed (FDM). In this short PUCCH, UCI and an RS may be placed in different frequency resources (for example, PRBs, resource units, resource elements, subcarriers, etc.). In this case, if a single-carrier waveform is applied to the short PUCCH, there is a possibility that the peak-to-average power ratio (PAPR) will increase, so that a multicarrier waveform is preferable.

Note that, although FIGS. 1A and 1B each show an example in which a short PUCCH is mapped to the second symbol from the end of a slot and/or the last symbol, the short PUCCH is by no means limited to these locations. For example, a given number of symbols at the beginning or in the middle of the slot may serve as symbols for placing the short PUCCH.

Meanwhile, a long PUCCH is placed over a plurality of symbols in the slot so as to improve the coverage over the short PUCCH. In this long PUCCH, UCI and an RS (for example, the DMRS) may be time-division-multiplexed (TDM) or frequency-division-multiplexed (FDM). A long PUCCH may be referred to as a "PUCCH with a lower (smaller, narrower, etc.) SCS" (for example, 15 kHz). Note that the unit of time in which one long PUCCH is transmitted may be referred to as a "long TTI."

A long PUCCH may be comprised of a number of frequency resources to match a short PUCCH, or a long PUCCH may be comprised of a smaller number of frequency resources (for example, one or two PRBs) than a short PUCCH, in order to achieve a power boosting effect. Also, a long PUCCH may be placed with a short PUCCH in the same slot.

For a long PUCCH, a single-carrier waveform (for example, DFT-S-OFDM waveform) may be used, or a multicarrier waveform (for example, OFDM waveform) may be used. In addition, a long PUCCH may be applied frequency hopping per given period within a slot (for example, per mini-slot (sub-slot)).

Note that a long PUCCH may be a PUCCH that is different from the PUCCHs (PUCCHs of different formats) stipulated in existing LTE systems (for example, LTE Rel. 8 to 13).

Figure 2A:
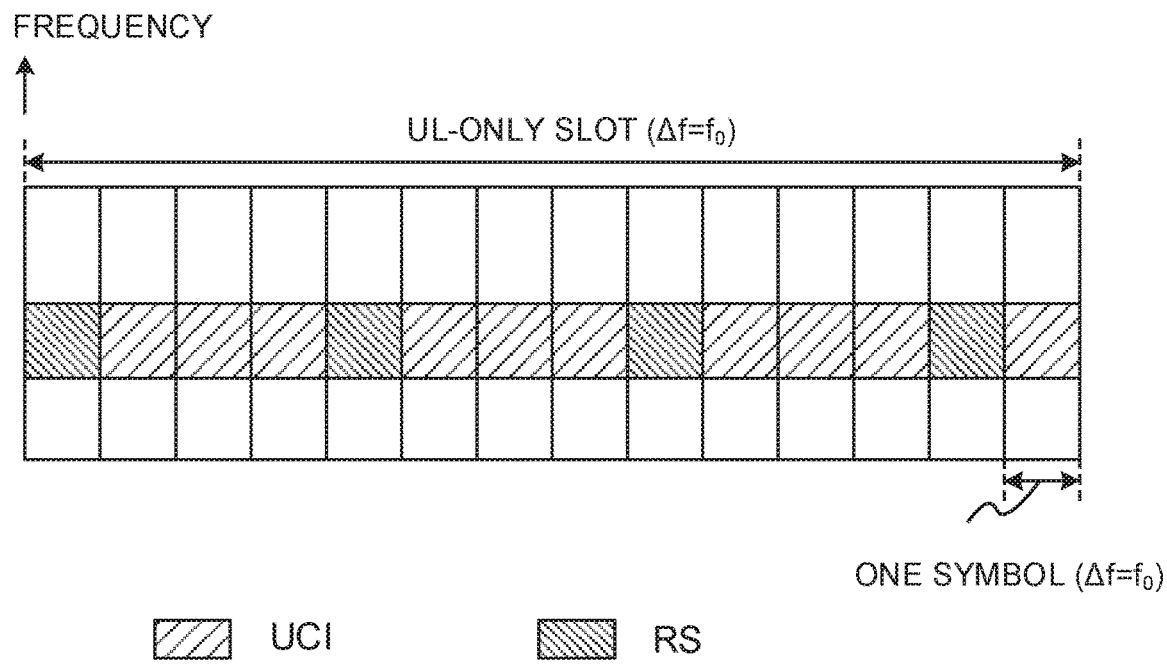
FIGS. 2A and 2B are diagrams, each showing an example of a long PUCCH format in future radio communication systems.
Figure 2B:
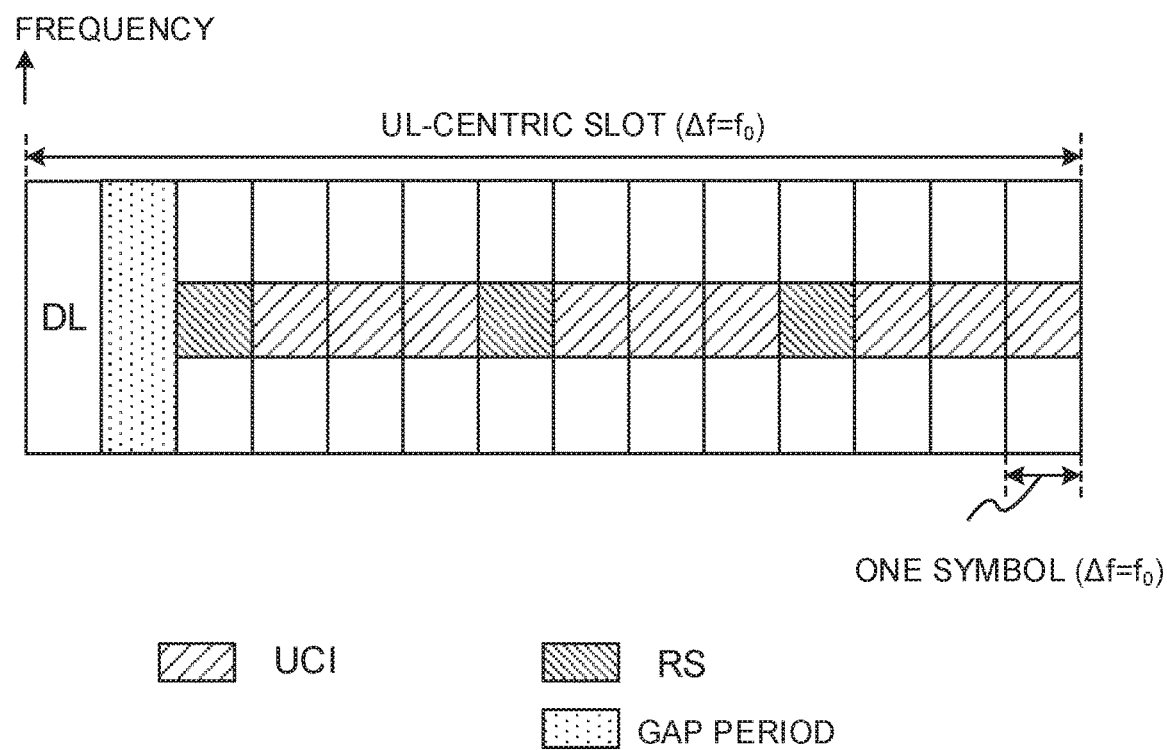
Figure 3A:
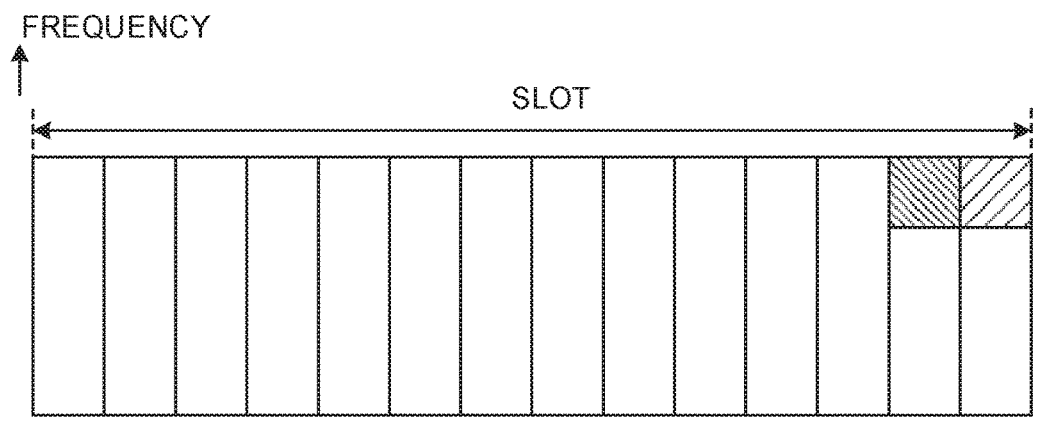
FIGS. 3A to 3D are diagrams to show examples of PUCCH formats in link budget calculation.
Figure 3B:
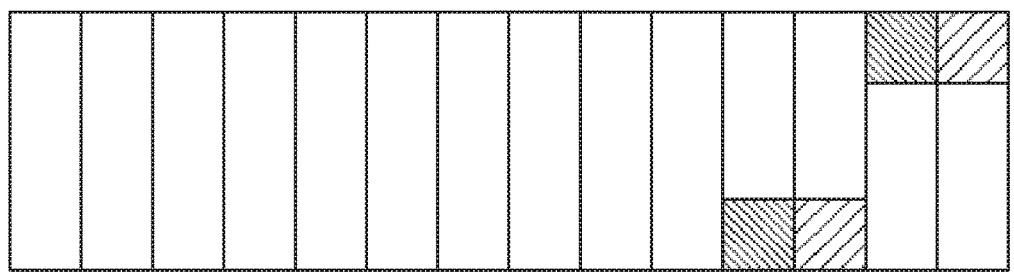
Figure 3C:
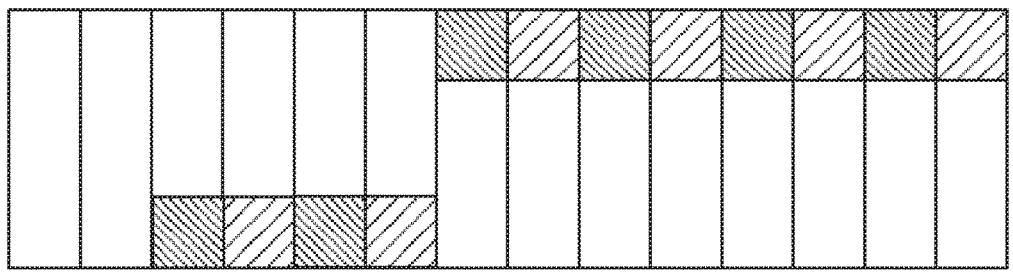
Figure 3D:
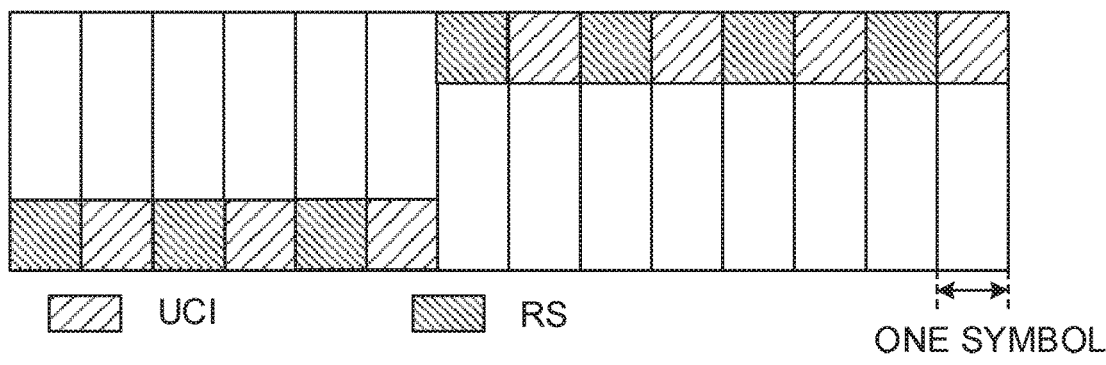

FIGS. 2A and 2B are diagrams, each showing an example of a long PUCCH format in future radio communication systems. In these examples, one slot is formed with fourteen symbols, each having a subcarrier spacing of $\Delta f = f_0$ (for example, 15 kHz), but the number of symbols to be contained in one slot is by no means limited to this.

FIG. 2A shows an example of a slot (UL-only slot), in which UL signals (for example, PUSCH and/or PUCCH) are transmitted/received, and FIG. 2B shows an example of a slot (UL-centric slot), in which DL signals (for example, PUCCH) are transmitted and received in a given number of symbols (here, in the first one symbol), a symbol (gap period) for switching between DL and UL is provided, and UL signals (for example, PUSCH and/or PUCCH) are transmitted and received in the rest of the symbols. Note that the slots where a long PUCCH can be applied are by no means limited to UL-only slots and/or UL-centric slots.

In the UL-only slot shown in FIG. 2A, a long PUCCH is placed over all of the fourteen symbols constituting the slot. In the short PUCCH shown in FIG. 2A, UCI is mapped over a plurality of UCI symbols (here, ten symbols) by using at least one of spreading, repetition and coding.

In the UL-centric slot of FIG. 2B, a long PUCCH is placed over twelve symbols in the slot, which are for UL signals. In the short PUCCH shown in FIG. 2B, UCI is mapped over multiple UCI symbols (here, nine symbols) by using at least one of spreading, repetition and coding.

Hereinafter, a "PUCCH," when mentioned as is, may be interpreted as "a short PUCCH and/or a long PUCCH."

A PUCCH may be time-division-multiplexed (TDM) and/or frequency-division-multiplexed (FDM) with a UL data channel (hereinafter also referred to as a "PUSCH") in the slot. Also, the PUCCH may be time-division-multiplexed (TDM) and/or frequency-division-multiplexed (FDM) with a DL data channel (hereinafter also referred to as "PDSCH")

and/or a DL control channel (hereinafter also referred to as "PUCCH (Physical Downlink Control CHannel)") within the slot.

In NR, the number of symbols to allocate to the PUCCH (which may be referred to as "PUCCH allocation symbols," "PUCCH symbols," etc.) may be determined on a per slot basis, on a per cell basis, on a per UE basis, or in a manner combining these. Given the general expectation that the communicating distance (coverage) expands in proportion to the number of PUCCH symbols, an operation may be possible where more symbols are reserved for UEs that are located farther from a base station (for example, an eNB, a gNB, etc.).

The relationship between the number of PUCCH symbols and coverage will be explained based on results of link budget calculation.

The conditions of link budget calculation include that the antenna format is comprised of one transmitting antenna and two receiving antennas, the carrier frequency is 4 GHz, the SCS is 15 kHz, the channel model is EPA (Extended Pedestrian A), and the length of the UCI payload is two bits.

FIG. 3 is a diagram to show examples of PUCCH formats in link budget calculation. FIGS. 3A to 3D show PUCCHs of two symbols, four symbols, twelve symbols and fourteen symbols, respectively.

In link budget calculation, BER (Bit Error Rate) performance is evaluated using these PUCCH formats, the SNR (Signal-to-Noise Ratio) that is required to achieve the required level of BER is calculated from each evaluation result, and the communicating distance (max distance) is calculated from the required SNR.

FIG. 4 is a diagram to show an example of results of link budget calculation. As shown in this drawing, when the number of PUCCH symbols increases, the coverage will improve (expand).

However, when the number of PUCCH symbols is increased for the purpose of improving coverage, the number of data symbols to allocate to UL/DL data channels (data) will decrease, and the efficiency of the use of resources (throughput) will be lower.

Figure 5A:
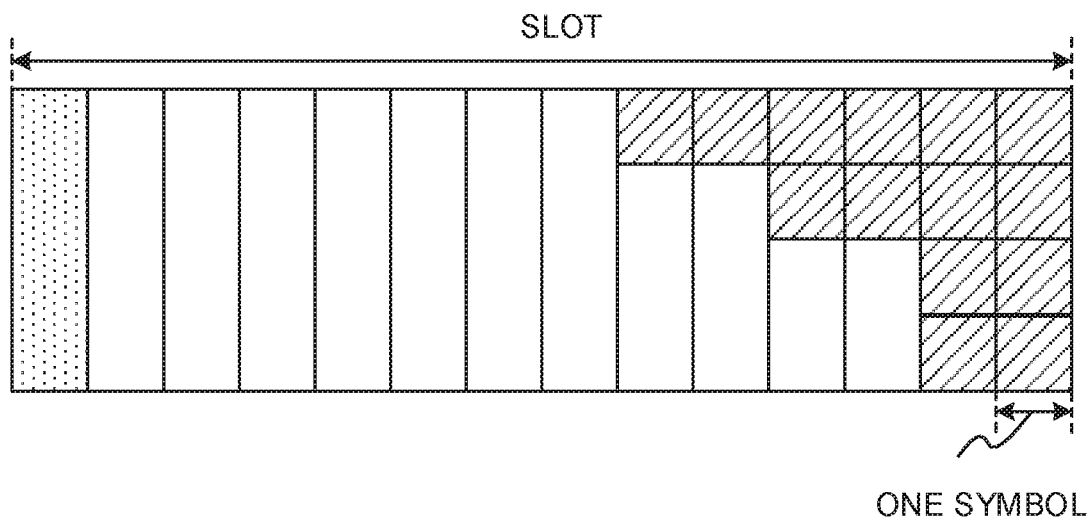
FIGS. 5A and 5B are diagrams to show relationships between the number of PUCCH symbols and the number of data symbols.
Figure 5B:
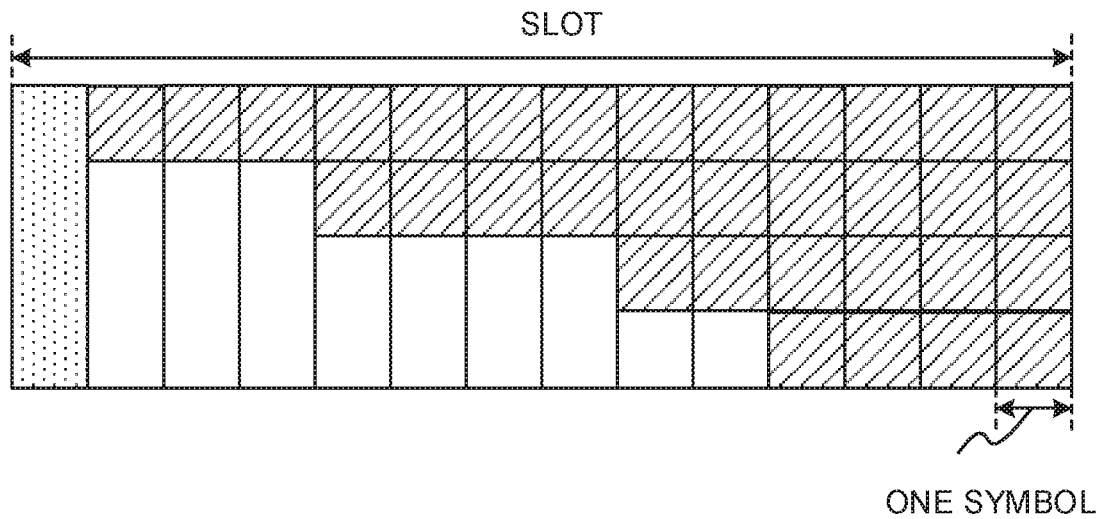

FIG. 5 are diagrams to show the relationship between the number of PUCCH symbols and the number of data symbols. FIG. 5A illustrates a case where the number of PUCCH symbols is configured to be one of two, four and six. Thus, when the number of PUCCH symbols is small, the number of data symbols large, so that the efficiency of the use of resources is high. FIG. 5B shows a case where the number of PUCCH symbols is configured to be one of four, six, ten, and thirteen. Thus, when the number of PUCCH symbols increases, the number of data symbols will decrease, so that the efficiency of the use of resources will be lower.

So, the present inventors have worked on a method of lowering the required SNR of the PUCCH and expanding the coverage while preventing the number of PUCCH symbols from increasing, and arrived at the present invention. According to one aspect of the present invention, UL signals are generated by using spreading code resources, which are associated with values of UL control information, and mapped to a plurality of time resources, so that it is possible to lower the required SNR compared to when PUCCH contains reference signals and UCI.

Now, embodiments of the present invention will be described in detail below with reference to the accompanying drawings. Note that the radio communication methods according to these embodiments may be applied individually or may be applied in combination.

In each of the following embodiments, a "symbol" might mean a "symbol" (time resource) that assumes a given numerology (for example, a given SCS).

Radio Communication Method

First Embodiment

According to a first embodiment of the present invention, UE can report UCI through sequence-based transmission. In sequence-based transmission, UCI is reported in a PUCCH (sequence-based PUCCH) that contains no RS for use for demodulating UCI, so that sequence-based transmission may be referred to as "non-coherent transmission," "non-coherent design" and/or the like.

For example, multiple candidates for transmission resources for sequence-based transmission are associated, respectively, with multiple candidate values of information that is reported (for example, UCI). The transmission resources may include spreading code resources that can be code-division-multiplexed (CDM). For example, the spreading code resources may be at least one of a base sequence, the amount of phase rotation (cyclic shift), and an OCC (Orthogonal Cover Code).

A plurality of candidates for transmission resources are provided from the network (for example, a radio base station) to UE. Information to represent multiple candidates may be reported from the network to the UE via higher layer signaling (for example, RRC (Radio Resource Control) signaling, MAC (Medium Access Control) signaling, broadcast information (the MIB (Master Information Block), SIBs (System Information Blocks), etc.), physical layer signaling (for example, DCI) or a combination of these. This allows the network to allocate resources for sequence-based PUCCHs to multiple UEs.

The UE may select one resource out of multiple candidates, depending on the value of the UCI that is reported, and transmit the sequence-based PUCCH by using the selected resource.

Here a case will be explained where the transmission resource is the amount of phase rotation. A plurality of candidate amounts of phase rotation that are assigned to one UE may be referred to as a "set of amounts of phase rotation." Although a case will be assumed here where the number of subcarriers, M, for use for a sequence-based PUCCH is twelve (in other words, a case where one PRB is used for a sequence-based PUCCH), this is by no means limiting.

The sequence length of a base sequence used for a sequence-based PUCCH is determined by the number of subcarriers M and the number of PRBs. In this case, one PRB is assumed, so that the sequence length of the base sequences is 12 (=12×1). In this case, twelve amounts of phase rotation $\alpha_0$ to $\alpha_{11}$, provided at phase intervals of $2\pi/12$, are set forth. The twelve sequences, obtained by applying phase rotation (cyclic shift) to one base sequence based on amounts of phase rotation $\alpha_0$ to $\alpha_{11}$, individually, are orthogonal to each other (with zero cross-correlation). Note that amounts of phase rotation $\alpha_0$ to $\alpha_{11}$ may be determined by at least one of the number of subcarriers M, the number of PRBs and the sequence length of the base sequence. The set of amounts of phase rotation may be comprised of two or more amounts of phase rotation that are selected from amounts of phase rotation $\alpha_0$ to $\alpha_{11}$.

FIG. 6 provide diagrams to show examples of sets of amounts of phase rotation. The length of UCI here is two bits. Since two-bit UCI can assume four values, a set of amounts of phase rotation contains four amounts of phase rotation.

Figure 6B:
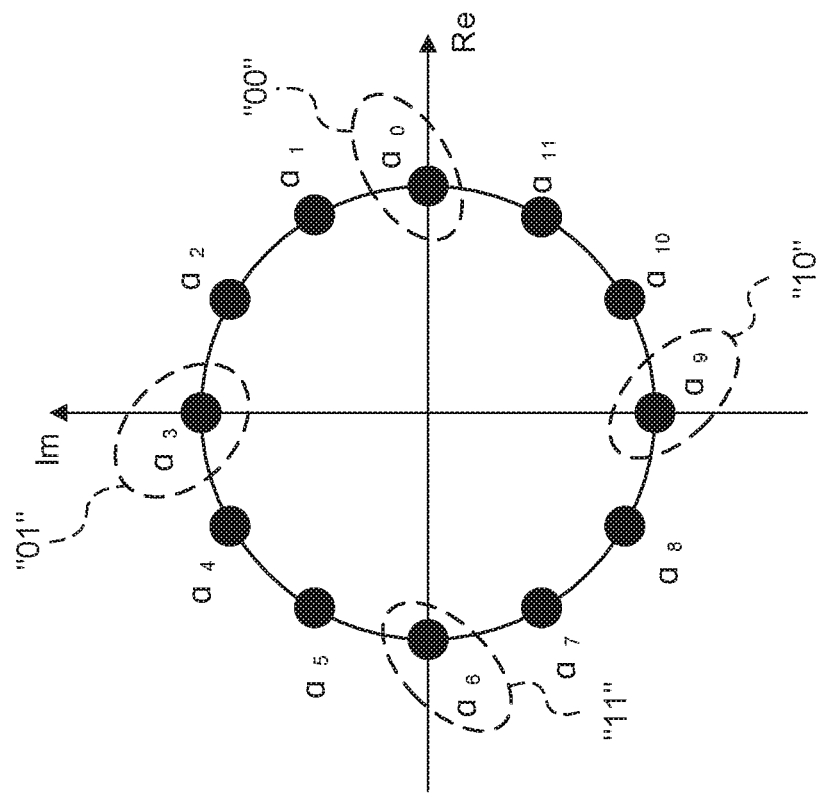
FIGS. 6A and 6B are diagrams to show examples of sets of amounts of phase rotation.
Figure 6A:
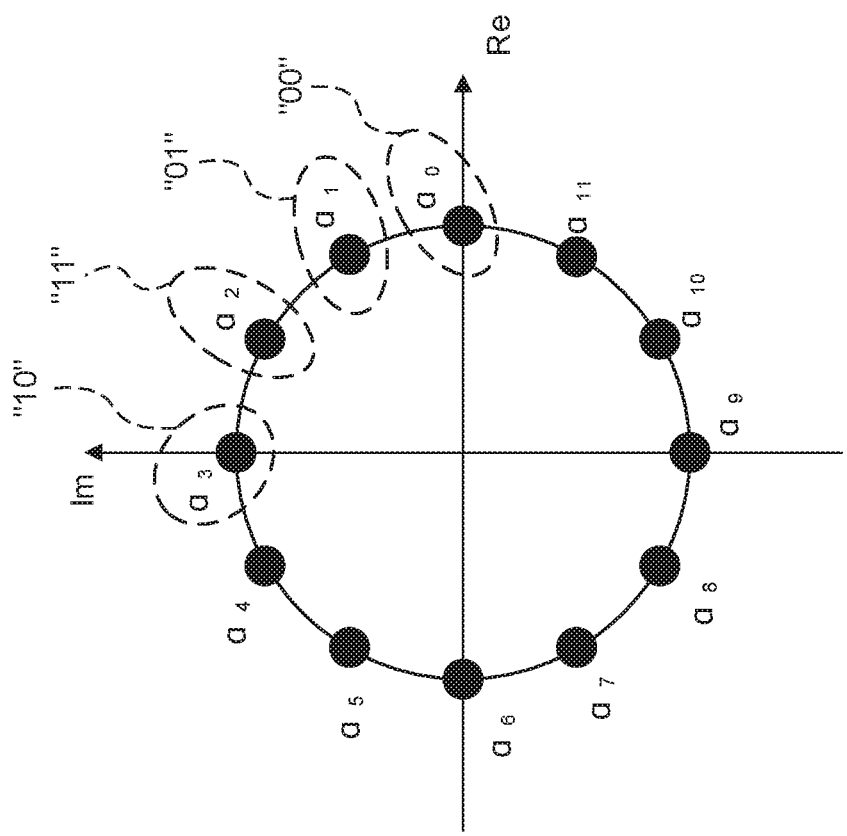

The set of amounts of phase rotation for sequence type (0) shown in FIG. 6A is comprised of a plurality of neighboring (continuous) amounts of phase rotation. This set of amounts of phase rotation includes four amounts of phase rotation $\alpha_0$, $\alpha_1$, $\alpha_2$ and $\alpha_3$, each spaced apart by $\pi/6$. The set of amounts of phase rotation for sequence type (1) shown in FIG. 6B is comprised of a plurality of amounts of phase rotation that are apart from each other. In this set of amounts of phase rotation, the gap between two neighboring amounts of phase rotation is the greatest, and four amounts of phase rotation $\alpha_0$, $\alpha_3$, $\alpha_6$, and $\alpha_9$, each spaced apart by $\pi/2$, are included.

In an environment that is little frequency-selective, both sequence type (0) and sequence type (1) produce little cross correlation (that is to say, sequences generated from each sequence type do not interfere with each other). Therefore, in an environment that is little frequency-selective, sequence type (0) and sequence type (1) have an equal UCI error rate. When sequence type (0) is used, twelve amounts of phase rotation can be provided more densely, so that three UEs can each use four amounts of phase rotation, allowing more efficient use of amounts of phase rotation.

On the other hand, in an environment that is strongly frequency-selective, there is significant cross correlation between sequences that are generated by applying neighboring amounts of phase rotation, so that UCI produces more errors. Therefore, when the frequency selectivity is strong, using sequence type (1) can lower the UCI error rate compared to when sequence type (0) is used.

The UE may assume using sequence type (0) if the transmission bandwidth allocated to a PUCCH is equal to or greater than a given value, and assume selecting sequence type (1) if the transmission bandwidth is less than the given value. By this means, the sequence type needs not be reported from the network, yet the UE can still choose the sequence type that fulfills a given error rate. Now, assume the case where, when the transmission bandwidth is greater, more amounts of phase rotation will be available, but not all of them are used. For example, if the amounts of phase rotation that can be used are limited to twelve regardless of the transmission bandwidth and the transmission bandwidth is six PRBs, 12×6=72 amounts of phase rotation can be used. Of these, only twelve amounts of phase rotation are used, so that, even when sequence type (0) is used, the intervals between these amounts of phase rotation each match six amounts of phase rotation, and therefore sequences that are generated based on neighboring amounts of phase rotation in the twelve amounts of phase rotation are little cross-correlated.

Figure 7:
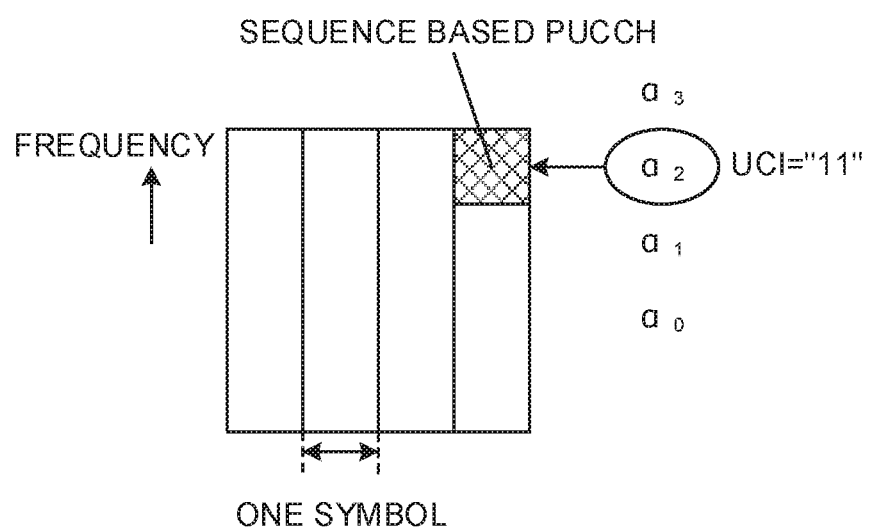
FIG. 7 is a diagram to show an example of a sequence-based PUCCH.

FIG. 7 is a diagram to show an example of a sequence-based PUCCH. When a UE, to which the set of amounts of phase rotation shown in FIG. 6A is assigned, reports "11" as two-bit UCI, the UE rotates the phase of the base sequence based on corresponding $\alpha_2$, and generates the transmission signal of the sequence-based PUCCH.

FIG. 8 provide diagrams, each showing an example of the process of generating sequence-based PUCCH transmission signals. In the transmission signal generation process, base sequences $X_0$ to $X_{M-1}$, having a sequence length of M, are subjected to phase rotation (cyclic shift), based on amounts of phase rotation $\alpha$ that are selected, and the base sequences that have been subjected to phase rotation are input to an OFDM transmitter or a DFT-S-OFDM transmitter. The UE transmits output signals from the OFDM transmitter or the DFT-S-OFDM transmitter.

When amounts of phase rotation $\alpha_0$ to $\alpha_3$ are associated, respectively, with UCI information 0 to 3, and information 0 is reported as UCI, as shown in FIG. 8A, the UE applies phase rotation to base sequences $X_0$ to $X_{M-1}$, using amount of phase rotation $\alpha_0$, which is associated with information 0. Similarly, when the UE reports information 1 to 3 as UCI, the UE applies phase rotation to base sequences $X_0$ to $X_{M-1}$ by using amount of phase rotation $\alpha_1$, $\alpha_2$ and $\alpha_3$, which are associated with information 1 to 3, as shown in FIGS. 8B, 8C and 8D, respectively.

The UE may report UCI in sequence-based transmission or DMRS-based transmission. DMRS-based transmission reports UCI in a PUCCH (DMRS-based PUCCH) that contains the DMRS for demodulating UCI, and therefore may be referred to as "coherent transmission," "coherent design," and so on.

Figure 9A:
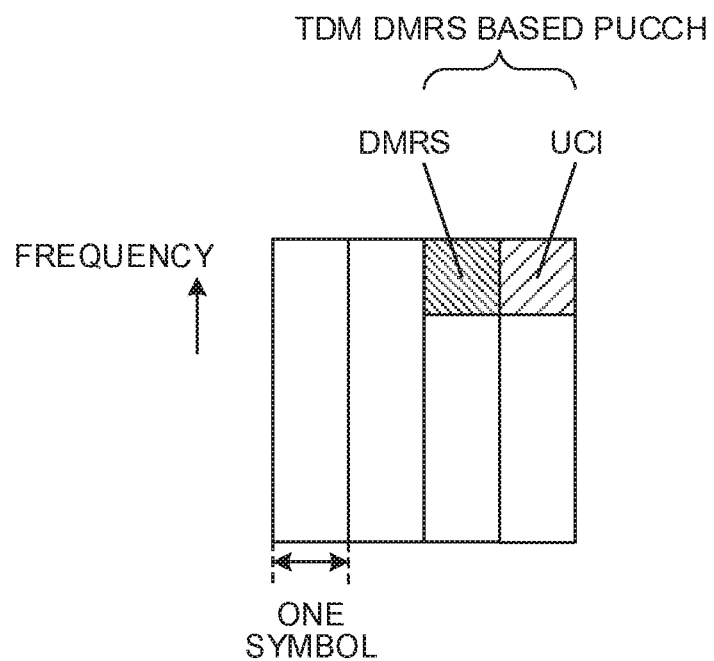
FIGS. 9A and 9B are diagrams to show examples of DMRS-based PUCCHs.
Figure 9B:
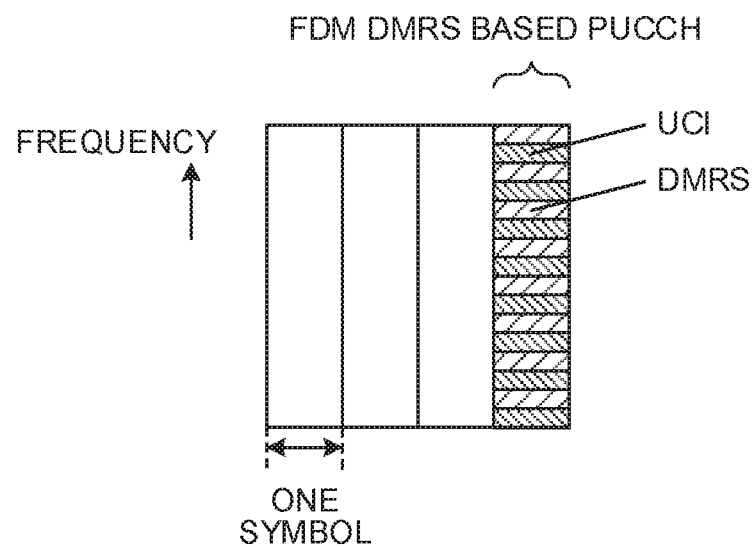

FIG. 9 provide diagrams to show examples of DMRS-based PUCCHs. A DMRS-based PUCCH may be a TDM DMRS-based PUCCH or an FDM DMRS-based PUCCH. For example, in the TDM DMRS-based PUCCH shown in FIG. 9A, a DMRS and UCI are allocated and time-division-multiplexed (TDM) per symbol or per short symbol. For example, in the FDM DMRS-based PUCCH shown in FIG. 9B, a DMRS and UCI are allocated and frequency-division-multiplexed (FDM) per subcarrier.

Information to identify between a sequence-based PUCCH and a DMRS-based PUCCH is reported from the network to the UE via higher layer signaling and/or physical layer signaling, and the UE may send the PUCCH specified by this information.

Furthermore, the UE may select a sequence-based PUCCH or a DMRS-based PUCCH depending on the length of the UCI payload. For example, when the length of the UCI payload is four bits or less, the UE may transmit a sequence-based PUCCH, and, otherwise, the UE may transmit a DMRS-based PUCCH.

The network may allocate at least one resource from a time resource, a frequency resource and a space resource (for example, MIMO (Multi Input Multi Output) layer or beam) to the PUCCH. The UE may transmit the sequence-based PUCCH or the DMRS-based PUCCH using this resource. The combination of a time resource and a frequency resource may be referred to as a "time/frequency resource."

For example, the network may allocate a plurality of symbols to the sequence-based PUCCH. The UE may map the sequence-based PUCCH that stretches over multiple symbols by applying at least one of spreading, repetition and encoding to one UCI payload or a code corresponding to one UCI payload. By increasing the number of PUCCH symbols, it is possible to lower the required SNR, and improve the coverage. Note that the UE may map the sequence-based PUCCH over a plurality of time resources (for example, a plurality of short symbols).

Figure 10:
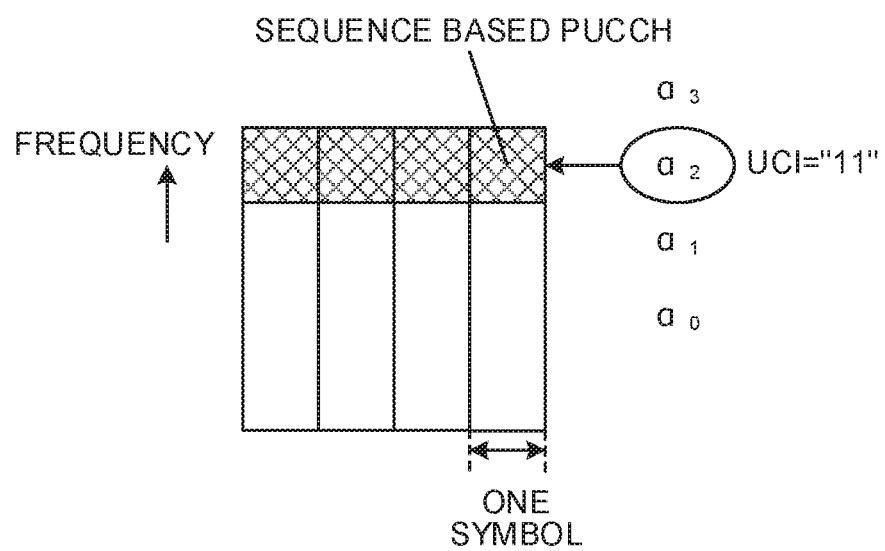
FIG. 10 is a diagram to show an example of a sequence-based PUCCH that stretches over multiple symbols.

FIG. 10 is a diagram to show an example of a sequence-based PUCCH that stretches over multiple symbols. The sequence-based PUCCH in this example is mapped to four symbols. A set of phase rotation amounts for sequence type (0) shown in FIG. 6A is assigned to the UE, and, when the value of UCI is "11," the UE applies phase rotation to the base sequence based on $\alpha_2$, and generates the transmission signal of the sequence-based PUCCH.

Figure 11:
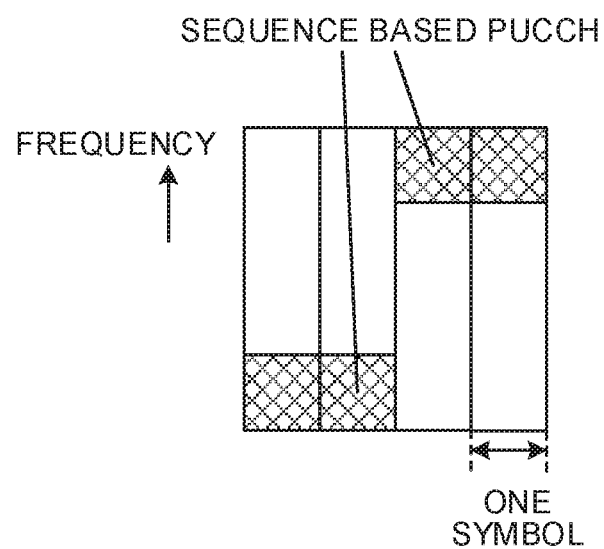
FIG. 11 is a diagram to show an example of a sequence-based PUCCH to which frequency hopping is applied.

The UE may apply frequency hopping to a sequence-based PUCCH or a DMRS-based PUCCH based on given rules. FIG. 11 is a diagram to show an example of a sequence-based PUCCH to which frequency hopping is applied. The sequence-based PUCCH in this example is mapped to four symbols, and frequency hopping is applied between the first two symbols and the last two symbols.

When one PUCCH symbol is allocated, the UE may widen the SCS of the PUCCH symbol more than the SCS of the data symbols, and split one PUCCH symbol into two short symbols. The UE may assume that, when one PUCCH symbol is split into two short symbols, the UE applies frequency hopping to the PUCCH. This can provide frequency diversity gain. Also, the UE may assume that, when one PUCCH symbol is split into two short symbols, frequency hopping is not applied to the PUCCH. This facilitates the resource allocation process at the radio base station.

Information that indicates whether symbol splitting (short symbols) is to be applied to the PUCCH may be configured from the network to the UE. If one PUCCH symbol is allocated, the UE may assume that symbol splitting is to be applied to the PUCCH.

Figure 12A:
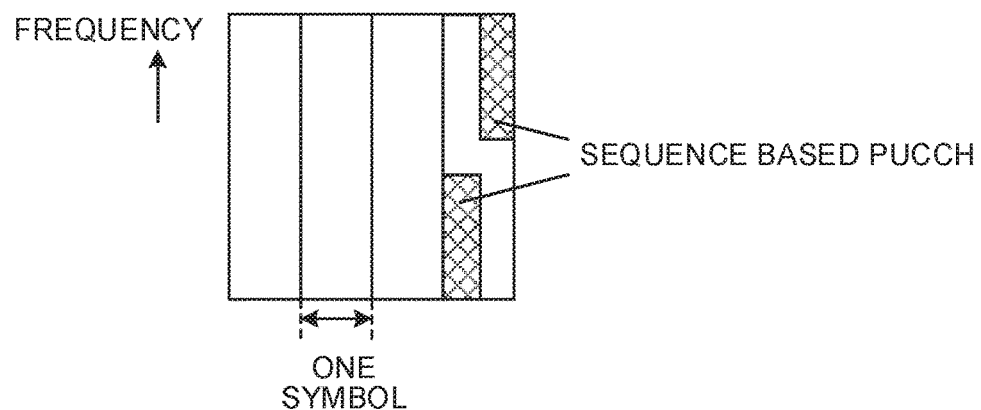
FIGS. 12A to 12C are diagrams to show examples of PUCCHs to which symbol splitting is applied.

FIG. 12 are diagrams to show examples of PUCCHs to which symbol splitting is applied. As shown in FIG. 12A, when the UE applies symbol splitting to a sequence-based PUCCH, the UE maps the sequence-based PUCCH to two short symbols, and executes frequency hopping between these two short symbols. In this case, even if there is only one PUCCH symbol, frequency hopping can be applied, so that frequency diversity gain can be provided.

Figure 12B:
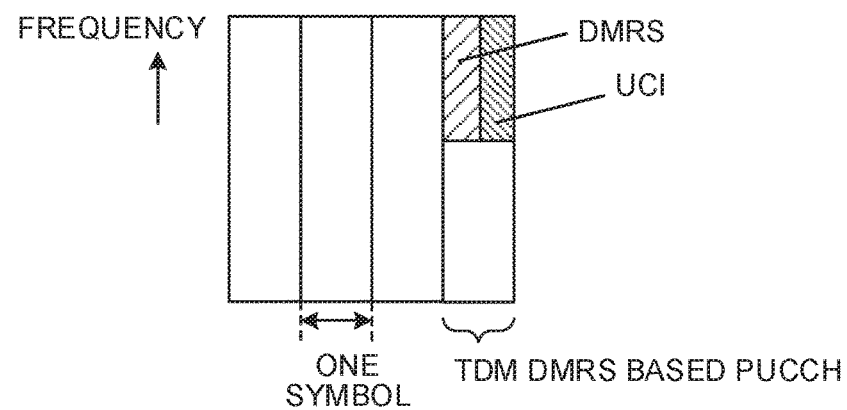
Figure 12C:
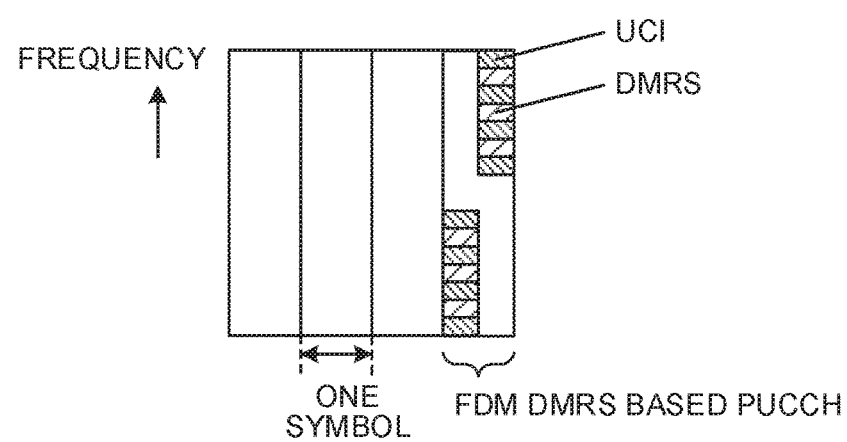

As shown in FIG. 12B, even if symbol splitting is applied to a TDM DMRS-based PUCCH, frequency hopping cannot be applied between two short symbols, and so frequency diversity gain cannot be provided. Meanwhile, when, as shown in FIG. 12C, symbol splitting is applied to an FDM DMRS-based PUCCH, although frequency hopping can be executed between two short symbols, the PAPR will increase, and so the power efficiency will decrease and the communication area (coverage) will become smaller. That is, a sequence-based PUCCH can expand the coverage compared to a DMRS-based PUCCH, which uses two short symbols likewise.

Figure 13A:
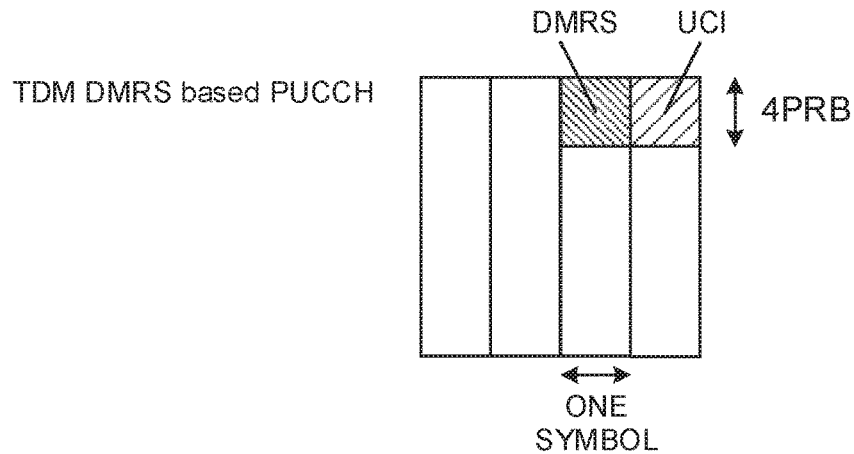
FIG. 13A to 13C are diagrams to show examples of PUCCHs that stretch over two symbols.
Figure 13B:
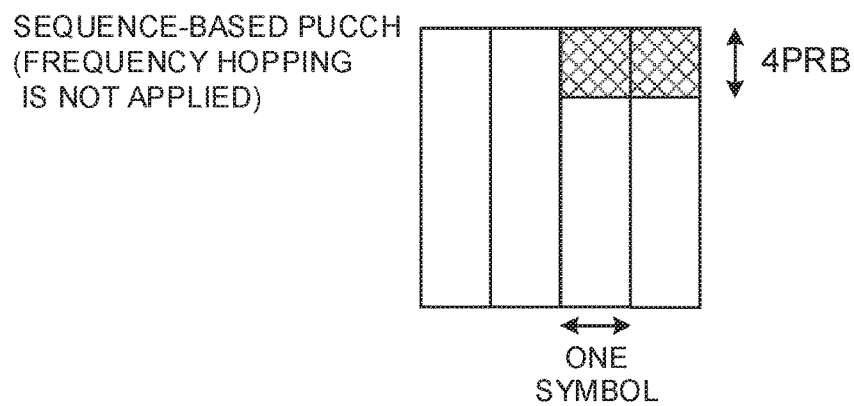
Figure 13C:
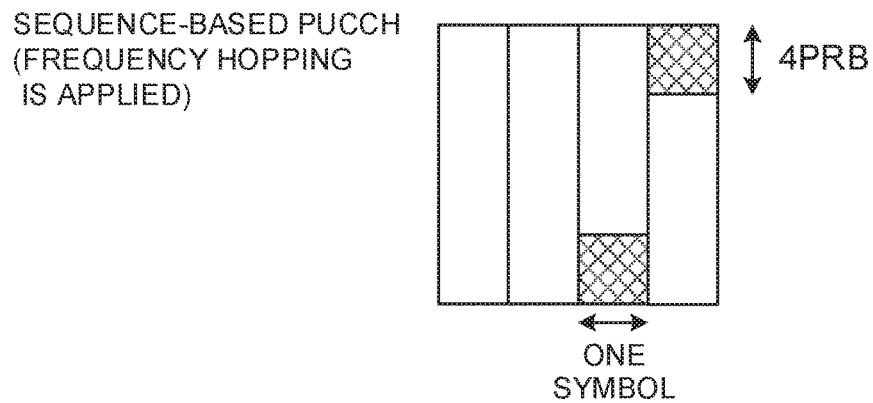

Next, the BER performance of sequence-based PUCCHs will be explained. FIG. 13 are diagrams to show examples of PUCCHs that stretch over two symbols. Here, the BER performance of a TDM DMRS-based PUCCH in which a DMRS of one symbol and UCI of one symbol are time-division-multiplexed (TDM) as shown in FIG. 13A, the BER performance of a two-symbol sequence-based PUCCH, to which frequency hopping is not applied, as shown in FIG. 13B, and the BER performance of a two-symbol sequence-based. PUCCH, to which frequency hopping is applied, as shown in FIG. 13C, will be compared. Each symbol has a bandwidth of four PRBs.

Figure 14:
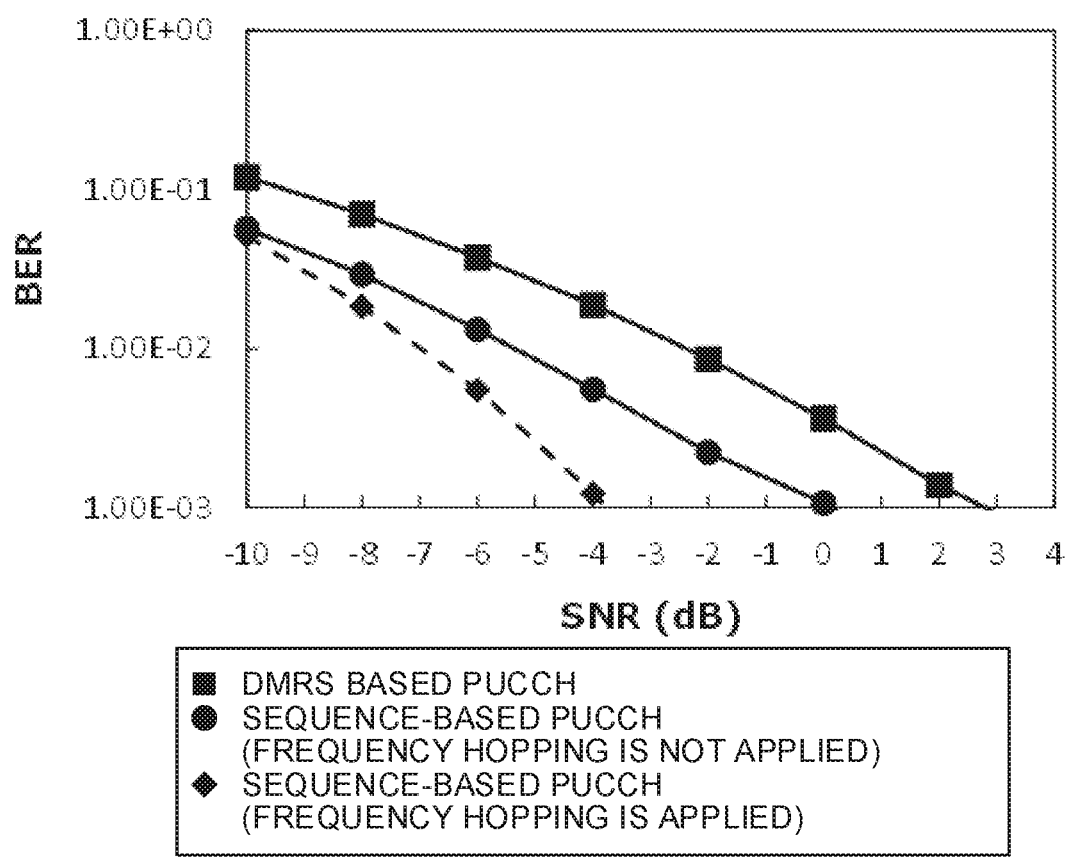
FIG. 14 is a diagram to show examples of BER performance of PUCCHs.

FIG. 14 is a diagram to show examples of BER performance of PUCCHs. The underlying the evaluation include that the UCI is two bits, the antenna format is comprised of s one transmitting antenna and two receiving antennas, the carrier frequency is 4 GHz, the SCS is 15 kHz and the channel model is EPA.

The BER performance of the sequence-based PUCCH where frequency hopping is not applied shows a gain of 3 dB, compared to the BER performance of the TDM DMRS-based PUCCH. This is because 50% of the DMRS overhead in the PUCCH is canceled. As to the BER performance of the sequence-based PUCCH where frequency hopping is applied, the frequency diversity gain can be provided, contrary to the BER performance of the sequence-based PUCCH without frequency hopping, so that the curve of BER performance becomes steep.

Next, characteristics of sequence-based PUCCHs according to the first embodiment will be described in comparison to DMRS-based PUCCHs.

As mentioned earlier, when a sequence-based PUCCH is used, the DMRS overhead in a TDM DMRS-based PUCCH is completely canceled.

When it is required that the number of PUCCH symbols be one, if a TDM DMRS-based PUCCH is used, it is necessary to split one symbol into two short symbols and allocate them to the DMRS and the UCI, respectively. Meanwhile, when a sequence-based PUCCH is used, the PUCCH can be transmitted in one symbol without splitting the symbol.

Frequency diversity cannot be applied to the TDM DMRS-based PUCCH, which is two symbols or two split short symbols. Meanwhile, the sequence-based PUCCH, which is two symbols or two split short symbols, can readily implement frequency diversity.

The PAPR of a sequence-based PUCCH can be lower than the PAPR of a DMRS-based PUCCH (at least an FDM DMRS-based PUCCH).

When the time duration of a sequence-based PUCCH is equal to the time duration of a DMRS-based PUCCH, the sequence-based PUCCH carries no DMRS overhead, and therefore demonstrates better BER performance than a DMRS-based PUCCH. Also, when the BER performance of a sequence-based PUCCH is equal to the BER performance of a DMRS-based PUCCH, the time duration of the sequence-based PUCCH can be made shorter than the time duration of the DMRS-based PUCCH.

Next, the method of multiplexing (CDM) sequence-based PUCCHs for multiple UEs on the same time/frequency resource will be described.

Figure 15:
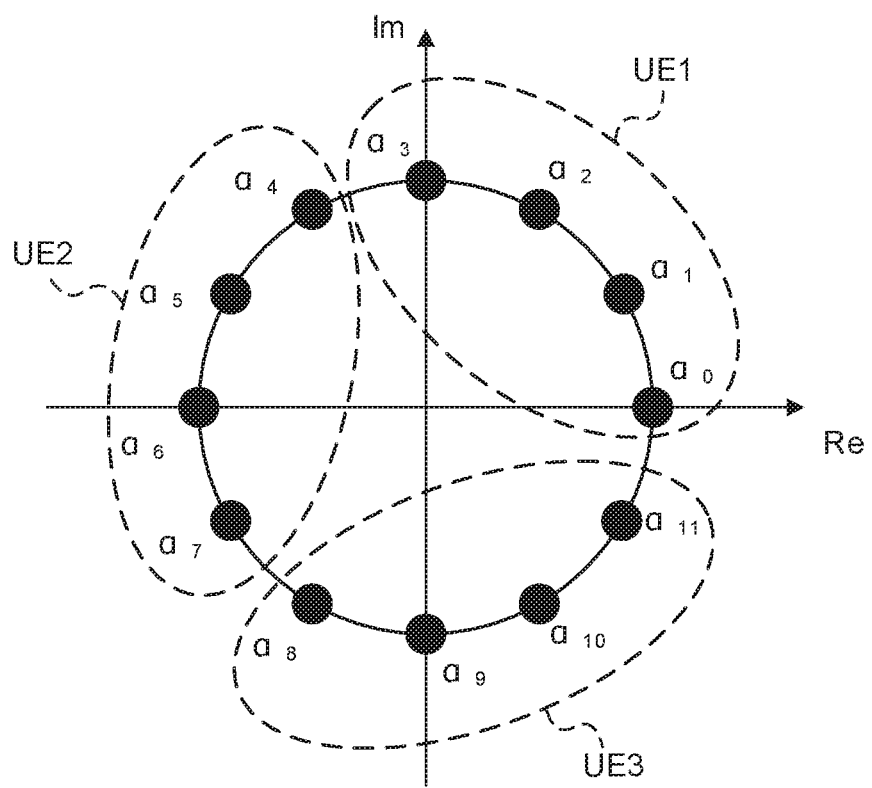
FIG. 15 is a diagram to show an example of the method of multiplexing sequence-based PUCCHs.

FIG. 15 is a diagram to show an example of the method of multiplexing sequence-based PUCCHs. When two-bit UCI is reported using twelve amounts of phase rotation, three sets of amounts of phase rotation, which do not overlap with each other, can be assigned to UE1, UE2 and UE3. Each set of amounts of phase rotation here is sequence type (0). $\alpha_0$ to $\alpha_3$ are assigned to UE1, $\alpha_4$ to $\alpha_7$ are assigned to UE2, and $\alpha_8$ to $\alpha_{11}$ are assigned to UE3. As a result of this, the PUCCHs of UE1, UE2 and UE3 are multiplexed on the same time/frequency resource.

Thus, in a sequence-based PUCCH, where one UE uses four amounts of phase rotation, up to three UEs can be multiplexed. On the other hand, in a DMRS-based PUCCH, where one UE uses one amount of phase rotation, up to twelve UEs can be multiplexed. Consequently, the maximum number of UEs that can be multiplexed in a sequence-based PUCCH is ¼ of the maximum number of UEs that can be multiplexed in a DMRS-based PUCCH.

Next, how UCI that is reported in a sequence-based PUCCH is decoded will be described. Here, although the receipt detection operation below will assume the case where UCI is reported by selecting the amount of phase rotation, the same operation will hold even when UCI is reported by making selections from the combinations of different types of resources (for example, base sequences, time/frequency resources, etc.) or multiple types of resources.

The network (for example, a radio base station) may detect UCI from a received signal using maximum likelihood detection (which may be referred to as "MLD" or "correlation detection"). To be more specific, the network may generate replicas of all amounts of phase rotation (phase rotation amount replicas) assigned to the user terminal (for example, the network may generate four of phase rotation amount replicas if the length of the UCI payload is two bits), and generate transmission signal waveforms, as the user terminal does, based on the base sequences and the phase rotation amount replicas. Also, the network may calculate the correlation between the transmission signal waveforms produced thus, and the waveform of the received signal from the user terminal, for all the phase rotation amount replicas, and assume that the phase rotation amount replica to show the highest correlation has been transmitted.

To be more specific, the network may multiply each element of received signal sequences of size M after DFT (M complex-number sequences) by complex conjugates of transmission signal sequences (M complex-number sequences), which are given by applying phase rotation to the base sequence of the transmission signal based on phase rotation amount replicas, and assume that the phase rotation amount replica, where the absolute value of the sum of the M sequences (or the squares of the absolute values) is the largest, has been sent.

Alternatively, the network may generate transmission signal replicas to match the maximum number of amounts of phase rotation that can be assigned (twenty four for two PRBs), and estimate the amount of phase rotation to yield the highest correlation with the received signal, based on the same operation as the MLD-based operation described above. When the amount of phase rotation estimated thus is not included in the assigned amounts of phase rotation, it is possible to assume that the one that is closest to the estimated value among the assigned phase rotation amounts has been transmitted.

Second Embodiment

According to a second embodiment of the present invention, UE can report UCI of a larger number of bits through sequence-based transmission.

Spreading code resources and time/frequency resources may be combined and used as transmission resources for reporting UCI. A plurality of candidates of transmission resources are associated with multiple candidate values of UCI, respectively. The multiple candidates may be reported from the network to UE via higher layer signaling and/or physical layer signaling.

The UE selects the transmission resource that corresponds to the value of the UCI to be reported, from the multiple candidates, and transmits a sequence-based PUCCH.

FIG. 16 are diagrams, each showing an example of a sequence-based PUCCH where the time/frequency resource and the amount of phase rotation are combined.

For example, if the time/frequency resource location reports one bit (first bit) and the amount of phase rotation reports two bits (second and third bits), UCI that is three bits in total can be reported. The time/frequency resource shown in FIG. 16A and the time/frequency resource shown in FIG. 16B are respectively associated with the values "0" and "1" of the first bit. $\alpha_0$ to $\alpha_3$ in the set of amounts of phase rotation for sequence type (0) shown in FIG. 6A are respectively associated with the values of the second and third bits.

Figure 16A:
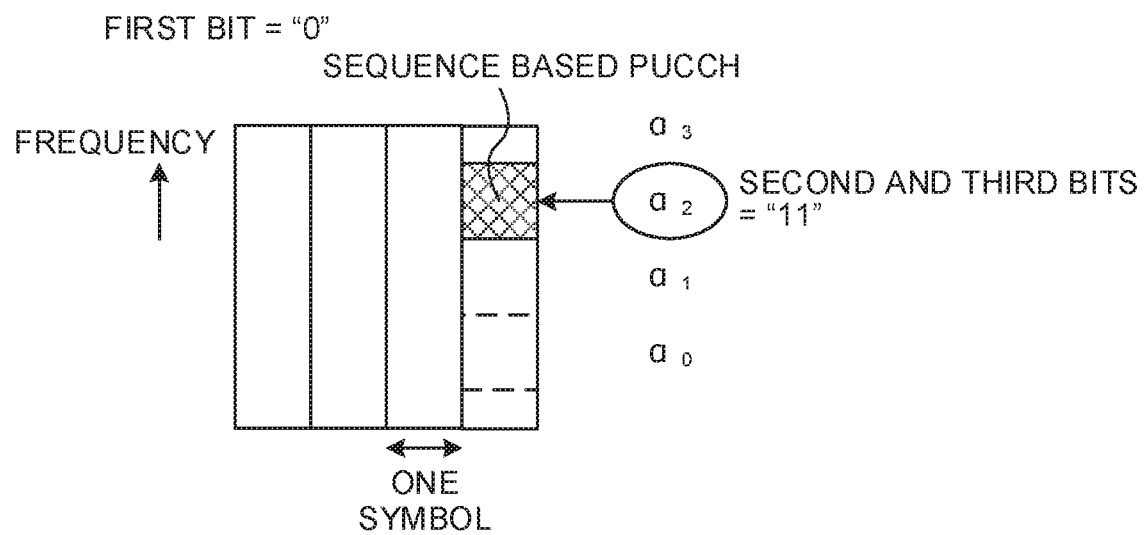
FIGS. 16A and 16B are diagrams to show examples of sequence-based PUCCHs that use the combination of the time/frequency resource and the amount of phase rotation.
Figure 16B:
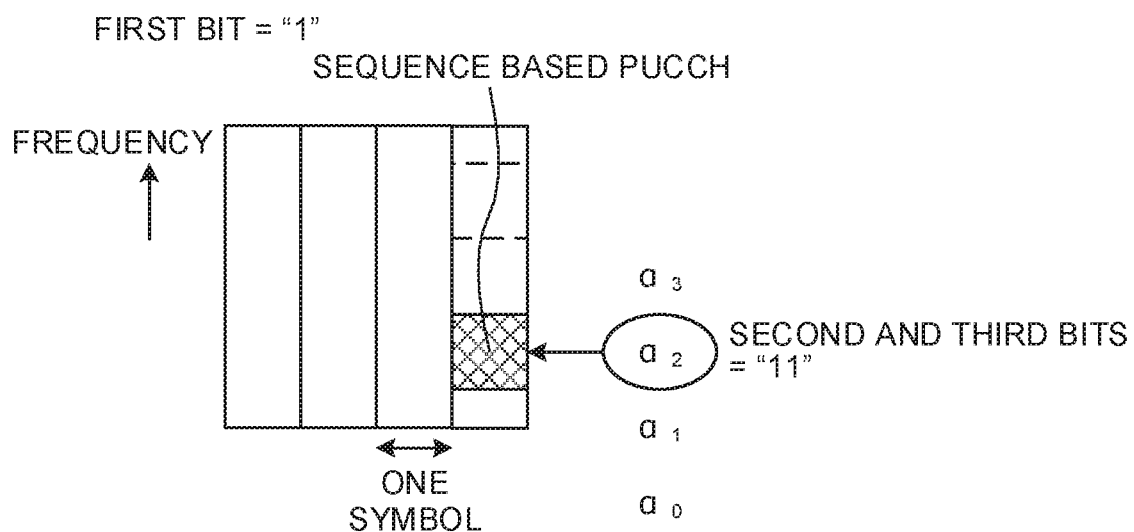
Figure 17A:
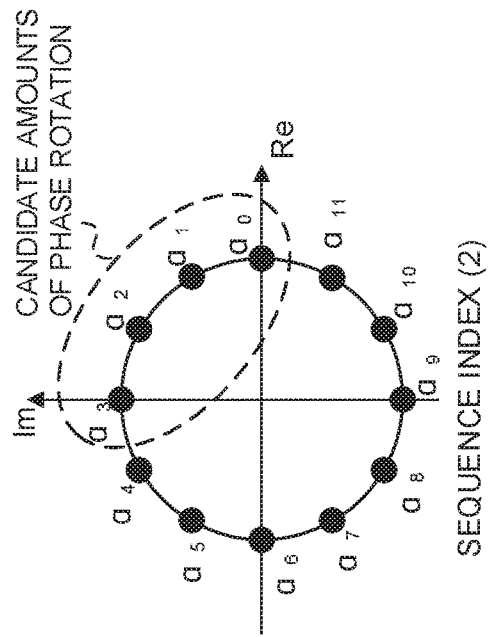
FIGS. 17A to 17D are diagrams to show examples of sequence-based PUCCHs, where the base sequence reports two bits and the amount of phase rotation reports two bits.
Figure 17B:
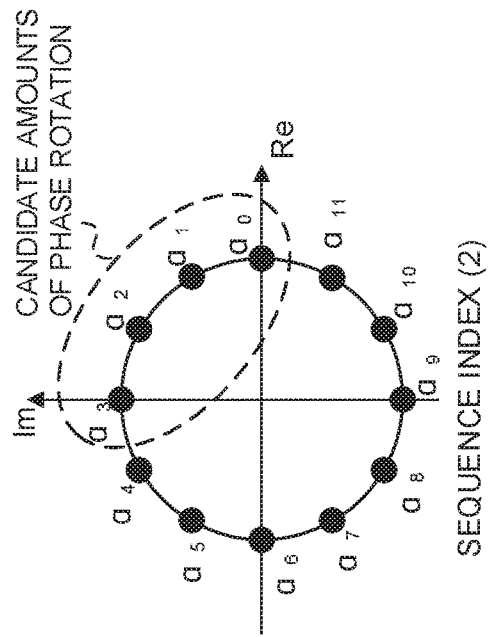
Figure 17C:
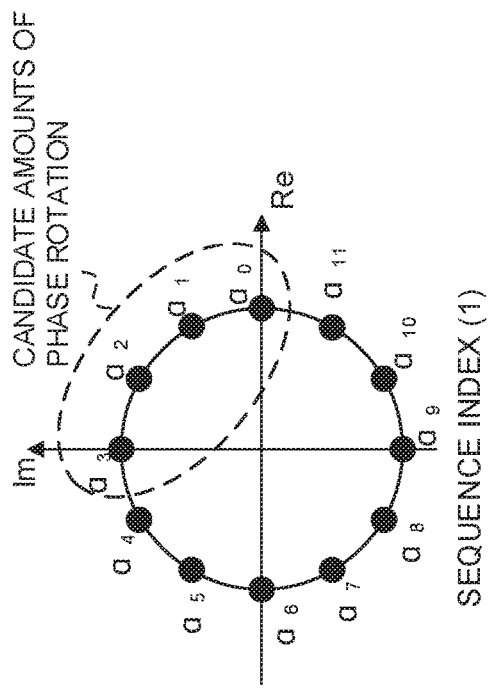
Figure 17D:
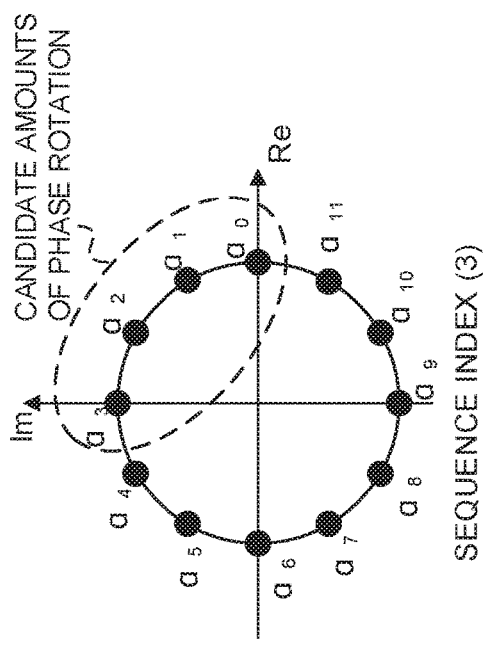

When the first bit of the UCI is "0" and the values of the second and third bits are "11," the UE generates the transmission signal of the sequence-based PUCCH using $\alpha_2$, and transmits the sequence-based PUCCH using the time/frequency resource shown in FIG. 16A. When the first bit of the UCI is "1" and the values of the second and third bits are "11," the UE generates the transmission signal of the sequence-based PUCCH using $\alpha_2$, and transmits the sequence-based PUCCH using the time/frequency resource shown in FIG. 16B.

As the first UCI decoding method, the network may decode the UCI based on MLD, which uses replicas of all three-bit patterns.

As a second UCI decoding method, the network may decode the first bit by measuring the received power of each of multiple candidates of the time/frequency resource. Furthermore, the UE may decode the second and third bits based on MLD, which uses replicas of all candidates of the second and third bits.

The first UCI decoding method can improve the error rate performance of UCI, compared to the second UCI decoding method. However, when the first UCI decoding method is applied to UCI consisting of a large number of bits, the MLD-based decoding process will be voluminous. The second UCI decoding method can reduce the volume of the decoding process compared to the first UCI decoding method.

Multiple candidate base sequences and multiple candidate amounts of phase rotation may be assigned to one UE. A number of candidate combinations of base sequences and amounts of phase rotation may be associated with multiple candidate values of UCI, respectively. The UE selects the combination that corresponds to the UCI to be reported, and generates the transmission signal of the sequence-based PUCCH.

For example, if the length of the UCI payload is four bits, the UE may report two bits of this UCI by selecting the base sequence, and report two bits by selecting the amount of phase rotation. It is possible to assume that multiple candidate combinations of base sequences and amounts of phase rotation are reported from the network to the UE via higher layer signaling and/or physical layer signaling.

Multiple candidate base sequences may be associated with UCI payload lengths and reported from the network to the UE via higher layer signaling and/or physical layer signaling. Base sequences may be identified by sequence indices. The UE may select the base sequence that corresponds to the length of the UCI payload to be reported, and generate the transmission signal of the sequence-based. PUCCH. In addition, multiple candidate amounts of phase rotation may be associated with multiple candidate values of UCI, and reported from the network to the UE via higher layer signaling and/or physical layer signaling. The UE may generate the transmission signal of the sequence-based PUCCH by using the amount of phase rotation that corresponds to the value of the UCI to be reported. The multiple candidate amounts of phase rotation may be the same irrespective of the base sequence. This makes it possible to reduce the amount of information that is required when multiple candidate amounts of phase rotation are reported.

In this example, the base sequence of sequence index (0) is associated with the case where the length of the UCI payload is two bits, and the base sequences of sequence indices (1) to (4) are associated with the case where the length of the UCI payload is four bits, and these are reported from the network to the UE. When the length of the UCI payload is two bits, the UE selects the base sequence of sequence index (0), which corresponds to the length of the UCI payload, selects the amount of phase rotation that corresponds to the value of the UCI to be reported, and generates the sequence-based PUCCH's transmission signal using the base sequence and the amount of phase rotation selected.

FIG. 17 are diagrams to show examples of sequence-based PUCCHs where the base sequence reports two bits and the amount of phase rotation reports two bits. When the length of the UCI payload is four bits, the UE selects a base sequence that corresponds to the upper two bits of the UCI to be reported, from sequence indices (1) to (4), selects an amount of phase rotation that corresponds to the lower two bits of the UCI to be reported, from $\alpha_0$ to $\alpha_4$ in the set of amounts of phase rotation, and generates the transmission signal of the sequence-based PUCCH using the base sequence and the amount of phase rotation that are selected. Sequence indices (1) to (4) are each associated with UCI's upper two bits "00," "01," "11," and "10," respectively. FIGS. 17A to 17D show the sets of amounts of phase rotation for use when sequence indices (1) to (4) are selected, respectively.

Note that multiple candidate amounts of phase rotation may be associated with UCI payload lengths, and reported from the network to the UE via higher layer signaling and/or physical layer signaling. The UE may generate the sequence-based PUCCH transmission signal by selecting the amount of phase rotation that corresponds to the length of the reporting UCI's payload. Furthermore, multiple candidate base sequences may be associated with multiple candidate values of UCI and reported from the network to the UE via higher layer signaling and/or physical layer signaling. The UE may select a base sequence that corresponds to the value of the reporting UCI, and generate the transmission signal of the sequence-based PUCCH.

Figure 18B:
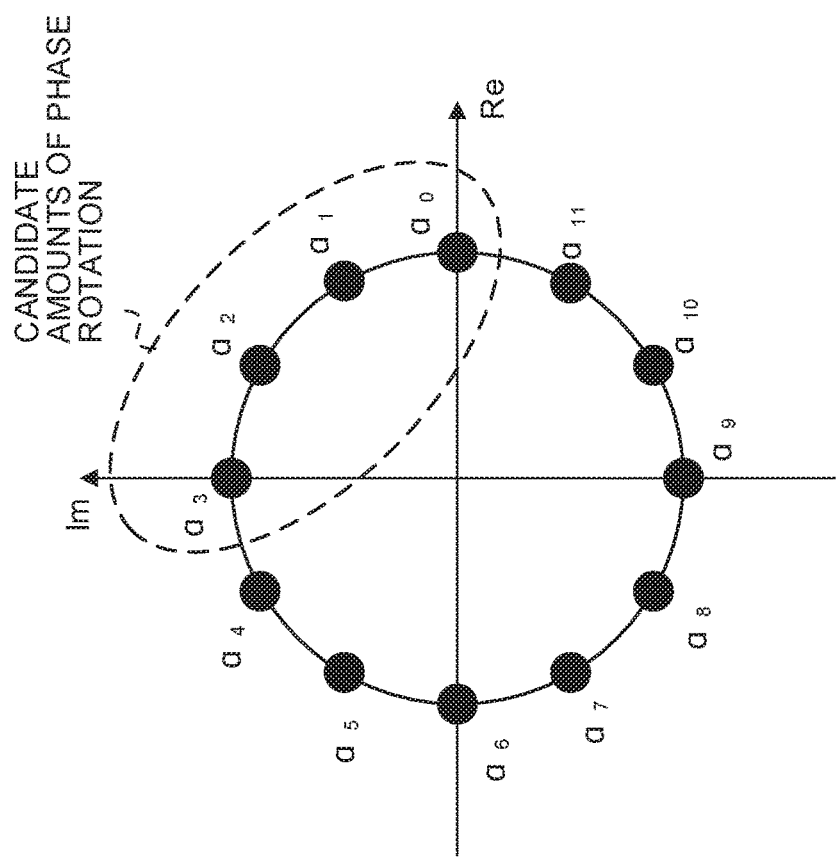
FIGS. 18A and 18B are diagrams to show examples of sequence-based PUCCHs, where the base sequence and the amount of phase rotation are combined to report four bits.
Figure 18A:
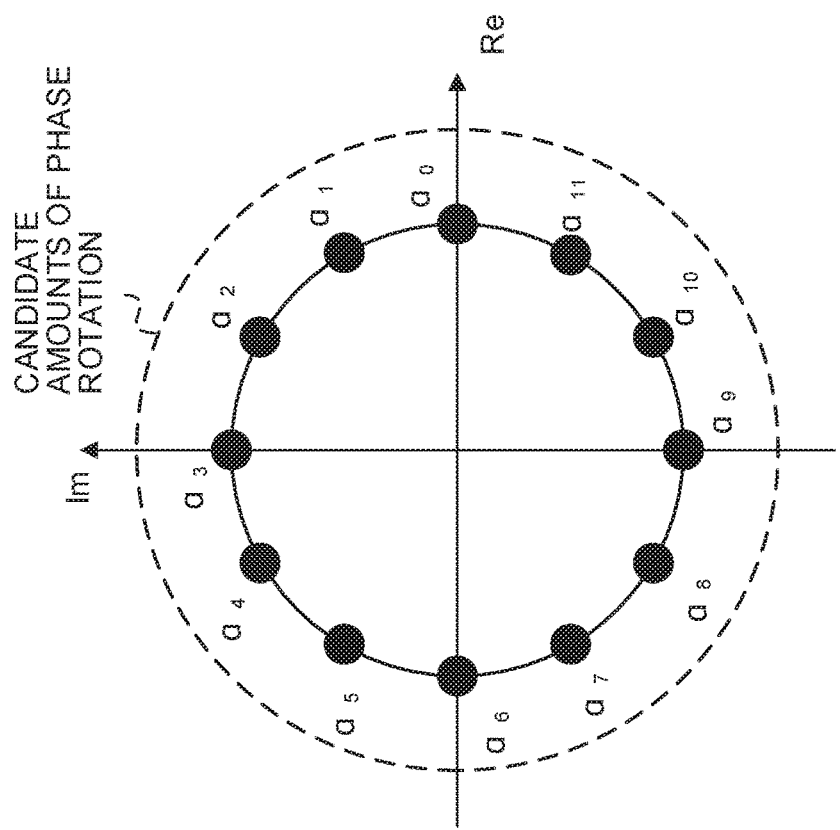

Multiple candidate combinations of base sequences and amounts of phase rotation may be associated with multiple candidate values of UCI, and reported from the network to the UE via higher layer signaling and/or physical layer signaling. FIG. 18 are diagrams to show examples of sequence-based PUCCHs, where the base sequence and the amount of phase rotation are combined to report four bits. In this example, spreading code resources are set in sixteen candidate patterns, including twelve candidate patterns, which combine the base sequence of sequence index (1) shown in FIG. 18A with each of amounts of phase rotation $\alpha_0$ to $\alpha_{11}$, and four candidate patterns, which combine the base sequence of sequence index (2) shown in FIG. 18B with each amount of phase rotation $\alpha_0$ to $\alpha_3$. The sixteen candidate patterns are associated with the sixteen candidate values which the four-bit UCI can represent, respectively, and reported from the network to the UE. The UE selects a pattern that corresponds to the value of the reporting UCI, from the sixteen candidate patterns, and generates the transmission signal of the sequence-based PUCCH.

According to this example, it is possible to allocate spreading code resources, which combine base sequences and amounts of phase rotation, to UEs, efficiently, without leaving excess resources. Meanwhile, since multiple candidate combinations of base sequences and amounts of phase rotation are reported from the network to UEs, the amount of information for reporting multiple candidates grows.

According to the second embodiment described above, when UCI consisting of a large number of bits is reported, it is possible to expand the coverage by lowering the required SNR, while preventing the number of PUCCH symbols from increasing.

In the event a DMRS-based PUCCH is used, if the number of UCI information bits to report increases, the transmission power per bit will decrease, and therefore the BER will increase and the coverage will be smaller. To prevent the coverage of DMRS-based PUCCHs from shrinking, it is necessary to increase the number of symbols.

On the other hand, in the event a sequence-based PUCCH is used, although a sequence that is transmitted (amount of phase rotation) yields more candidates as the number of UCI information bits to report increases, the error rate of the signal sequence that is transmitted does not change, even if the number of information bits increases, so that the coverage can be kept equal. Therefore, even when a sequence-based PUCCH is used to report UCI consisting of a large number of bits, it is possible to prevent the number of PUCCH symbols from increasing.

Third Embodiment

According to a third embodiment of the present invention, one UE's sequence-based PUCCH and another UE's DMRS-based PUCCH are multiplexed.

For example, one UE may transmit a sequence-based PUCCH by using the same time/frequency resource as the time/frequency resource for the DMRS in the time/frequency resources for another UE's DMRS-based PUCCH.

The time/frequency resource may be reported from the network to the UE via higher layer signaling and/or physical layer signaling. The sequence-based PUCCH and the DMRS-based PUCCH thus use the same time/frequency resource, so that the amount of information for reporting time/frequency resources can be reduced.

Figure 19A:
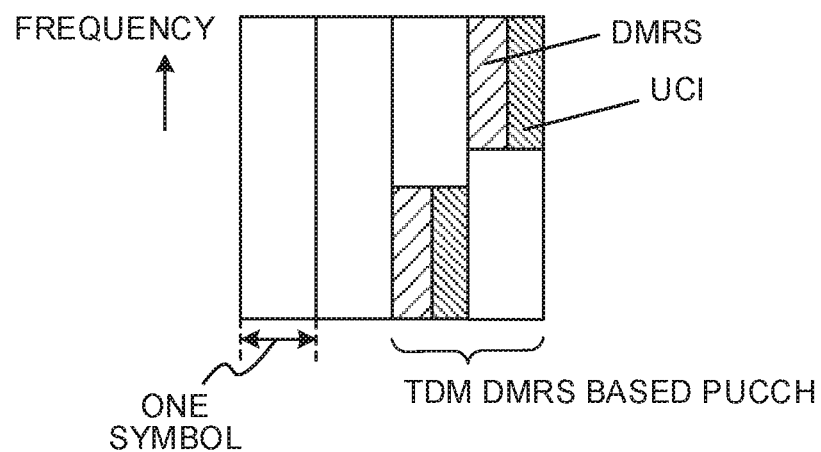
FIGS. 19A and 19B are diagrams to show an example of a sequence-based PUCCH that is multiplexed over the DMRS of another UE's TDM DMRS-based PUCCH.
Figure 19B:
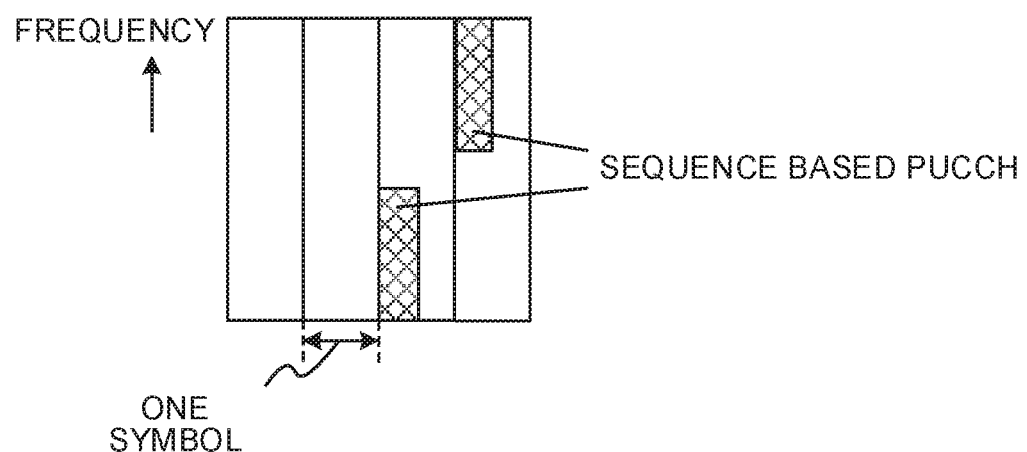

FIG. 19 are diagrams, each showing an example of a sequence-based PUCCH that is multiplexed over the DMRS in another UE's TDM DMRS-based PUCCH. In the TDM DMRS-based PUCCH shown in FIG. 19A, a DMRS and UCI are time-division-multiplexed (TDM) on two short symbols, followed by a DMRS and UCI that are time-division-multiplexed (TDM) on the next two short symbols, and frequency hopping is applied to these. The DMRS sequence is orthogonal to a sequence-based PUCCH (and is, for example, a CAZAC sequence). The sequence-based PUCCH of another UE, shown in FIG. 19B, uses only the time/frequency resource for the DMRS. The sequence of this sequence-based PUCCH is orthogonal to the DMRS (and is, for example, a CAZAC sequence). By this means, it is possible to multiplex the DMRS of a TDM DMRS-based PUCCH and a sequence-based PUCCH using the same time/frequency resource.

Figure 20A:
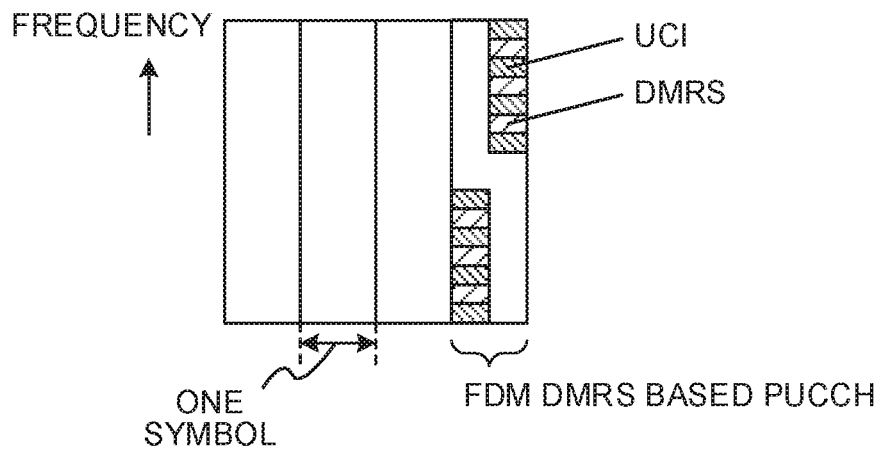
FIGS. 20A and 20B are diagrams to show an example of a sequence-based PUCCH that is multiplexed over the DMRS of another UE's FDM DMRS-based PUCCH.
Figure 20B:
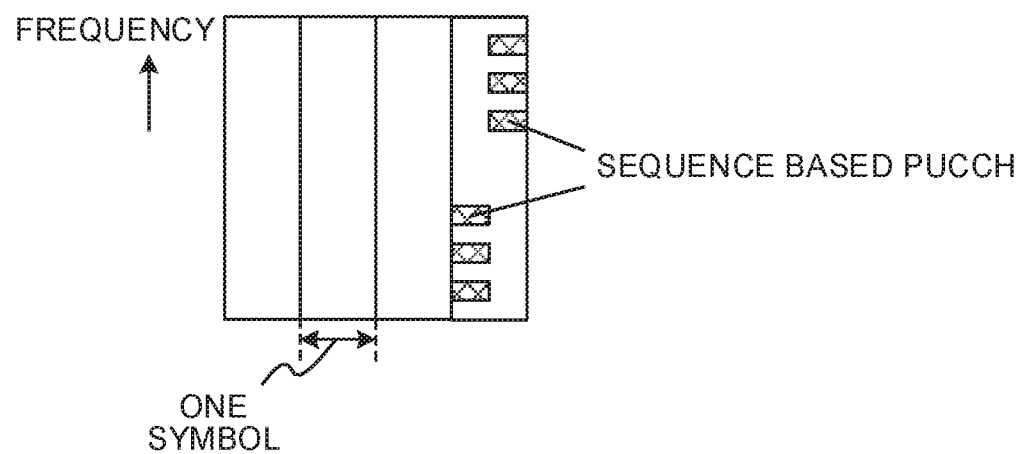

FIG. 20 are diagrams, each showing an example of a sequence-based PUCCH that is multiplexed over the DMRS of another UE's FDM DMRS-based PUCCH. In the FDM DMRS-based PUCCH shown in FIG. 20A, a DMRS and UCI are frequency-division-multiplexed (FDM) on one short symbol, followed by a DMRS and UCI that are frequency-division-multiplexed (FDM) on the next one short symbol, and frequency hopping is applied to these. The DMRS sequence is orthogonal to the sequence-based PUCCH (and is, for example, a CAZAC sequence). The sequence-based PUCCH of another UE, shown in FIG. 20B, uses only the time/frequency resource for the DMRS. The sequence of this sequence-based PUCCH is orthogonal to the DMRS (and is, for example, a CAZAC sequence). By this means, it is possible to multiplex the DMRS of an FDM DMRS-based PUCCH and a sequence-based PUCCH using the same time/frequency resource.

Figure 21A:
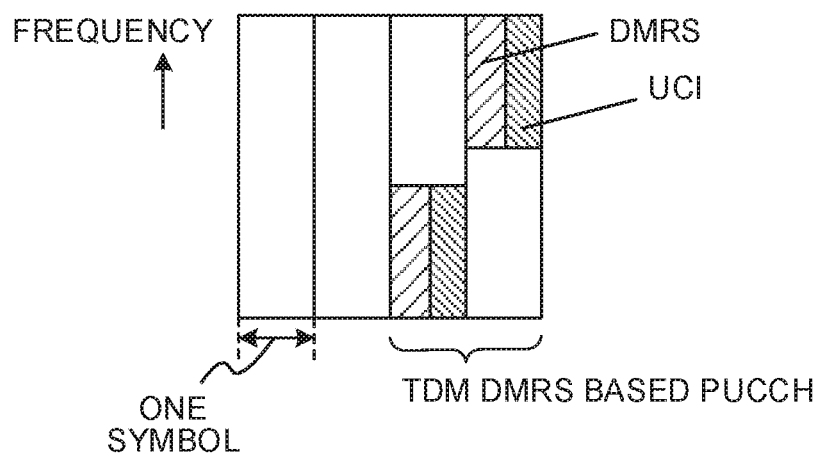
FIGS. 21A and 21B are diagrams to show an example of a sequence-based PUCCH that is multiplexed over another UE's TDM DMRS-based PUCCH.
Figure 21B:
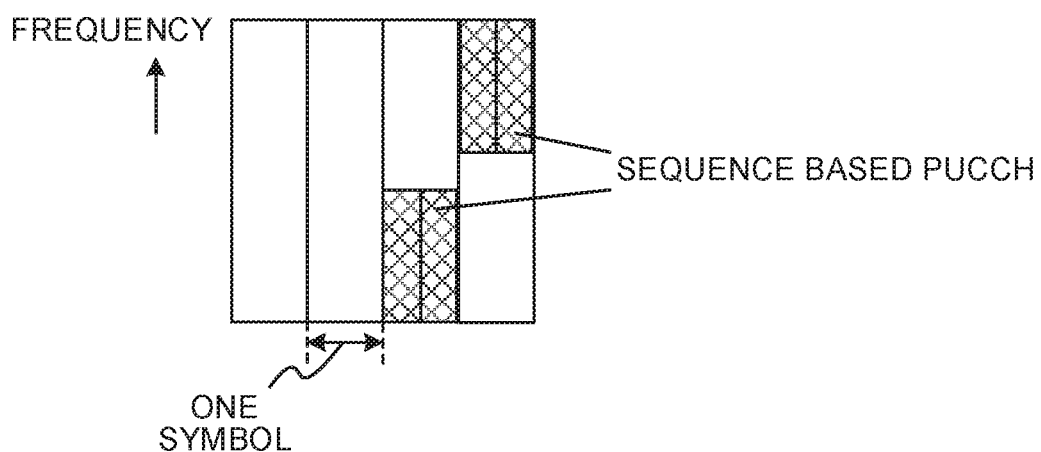

FIG. 21 are diagrams, each showing an example of a sequence-based PUCCH that is multiplexed on another UE's TDM DMRS-based PUCCH. The TDM DMRS-based PUCCH shown in FIG. 21A is the same as that shown in FIG. 19A, except that the UCI sequence is orthogonal to a sequence-based PUCCH (and is, for example, a CAZAC sequence). Another UE's sequence-based PUCCH shown in FIG. 21B is the same as that shown in FIG. 19B, except that the sequence of the part that is multiplexed with the DMRS is orthogonal to the DMRS (and is, for example, a CAZAC sequence), and the sequence of the part that is multiplexed with the UCI is orthogonal to the UCI (and is, for example, a CAZAC sequence). By this means, it is possible to multiplex a TDM DMRS-based PUCCH and a sequence-based PUCCH using the same time/frequency resource.

Figure 22A:
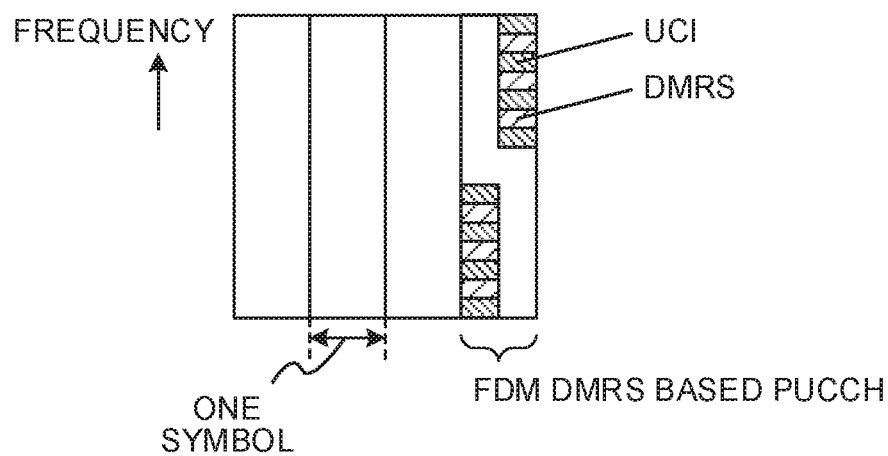
FIGS. 22A and 22B are diagrams to show an example of a sequence-based PUCCH that is multiplexed over another UE's FDM DMRS-based PUCCH.
Figure 22B:
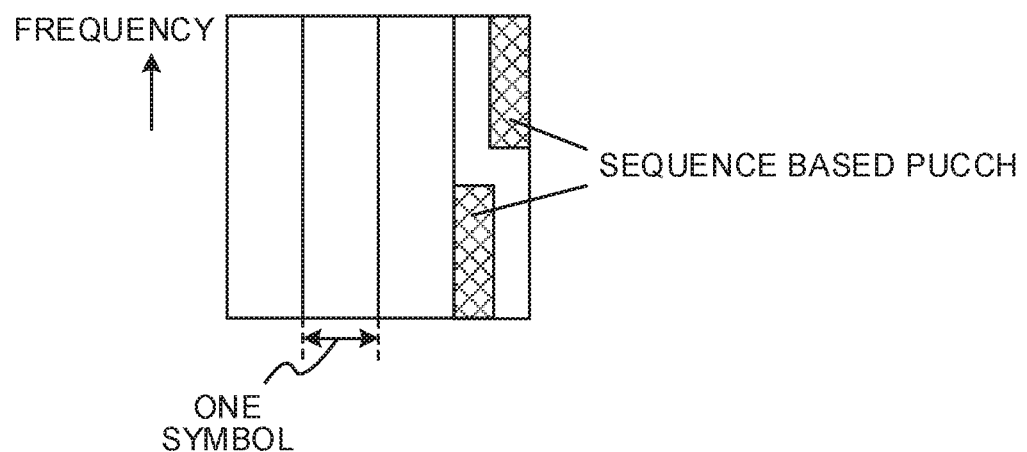

FIG. 22 are diagrams, each showing an example of a sequence-based PUCCH that is multiplexed on another UE's FDM DMRS-based PUCCH. The FDM DMRS-based PUCCH shown in FIG. 22A is the same as that shown in FIG. 20A, except that the UCI sequence is orthogonal to a sequence-based PUCCH (and is, for example, a CAZAC sequence). Another UE's sequence-based PUCCH shown in FIG. 22B is the same as that shown in FIG. 20B, except that the sequence of the part that is multiplexed with the DMRS is orthogonal to DMRS (and is, for example, a CAZAC sequence), and the sequence of the part that is multiplexed with the UCI is orthogonal to the UCI (and is, for example, a CAZAC sequence). By this means, it is possible to multiplex an FDM DMRS-based PUCCH and a sequence-based PUCCH using the same time/frequency resource.

Note that, even if the DMRS and/or the UCI of a DMRS-based PUCCH are not sequences orthogonal to a sequence-based PUCCH, by multiplying these sequences by OCCs, the DMRS-based PUCCH and the sequence-based PUCCH can be multiplexed over the same time/frequency resource.

According to the third embodiment described above, a sequence-based PUCCH and a DMRS-based PUCCH are multiplexed, so that it is possible to reduce the time/frequency resources, and improve the efficiency of the use of resources. Also, it is possible to reduce the amount of information for reporting time/frequency resources.

Details of Characteristics

Now, each embodiment's characteristics will be explained in detail below.

Base sequences that are used as spreading code resources may be CAZAC (Constant Amplitude Zero Auto-Correlation) sequences (for example, Zadoff-Chu sequences), or may be sequences that are equivalent to CAZAC sequences (for example, CG-CAZAC (Computer-Generated CAZAC) sequences), such as ones specified in 3GPP TS 36.211 § 5.5.1.2 (in particular, table 5.5.1.2-1 and table 5.5.1.2-2).

Information about base sequences may be reported from the network to UEs via higher layer signaling and/or physical layer signaling. Information related to selection of CAZAC sequences, information about the amount of phase rotation to apply to CAZAC sequences, information about sequences conforming to CAZAC sequences (for example, information about the rows and/or columns in the above tables (information as to which row and/or column the value that is used corresponds)) and suchlike pieces of information may be reported from the network to UEs.

Note that base sequences may be subjected to orthogonal spreading and transmitted. For example, a plurality of orthogonal codes (for example, OCCs) may be assigned to a plurality of UEs, respectively. In this case, the same time/frequency resource, base sequence, and amount of phase rotation can be shared by multiple UEs, so that the efficiency of the use of resources can be improved. However, the PAPR might increase. If orthogonal spreading is not used, the PAPR can be kept low.

Next, the maximum number of UEs that can be multiplexed on a sequence-based PUCCH will be explained in comparison with a DMRS-based PUCCH.

A case of reporting two-bit UCI will be explained below.

Figures 23A, 23B:
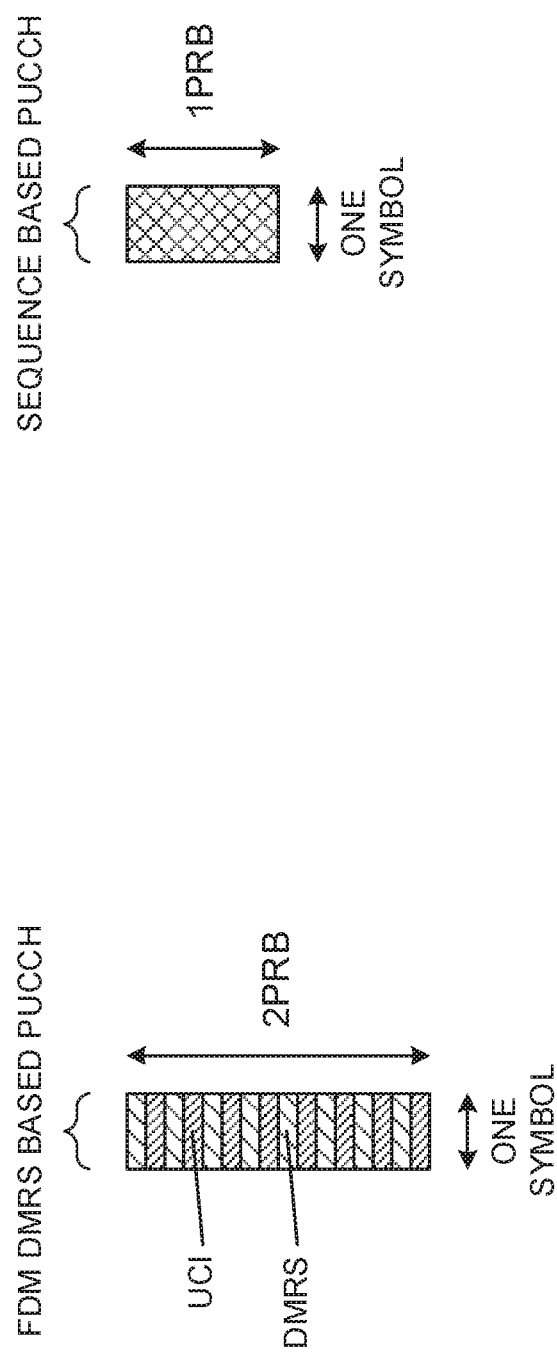
FIGS. 23A and 23B are diagrams to show the formats of an FDM DMRS-based PUCCH and a sequence-based PUCCH in the event two-bit UCI is reported.

FIG. 23 are diagrams to show the formats of an FDM DMRS-based PUCCH and a sequence-based PUCCH in the event two-bit UCI is reported. In the FDM DMRS-based PUCCH shown in FIG. 23A, a DMRS and two-bit UCI are frequency-division-multiplexed (FDM) using one symbol and two PRBs. The sequence-based PUCCH shown in FIG. 23B reports two-bit UCI using one symbol and one PRB. The BER performance of an FDM DMRS-based PUCCH comprised of two PRBs like this is the same as the BER performance of a sequence-based PUCCH comprised of one PRB. In other words, when two-bit UCI is reported, a sequence-based PUCCH can cancel the DMRS overhead, and therefore can reduce the time/frequency resources to ½ compared to a DMRS-based PUCCH, to achieve the same BER performance.

Figure 24B:
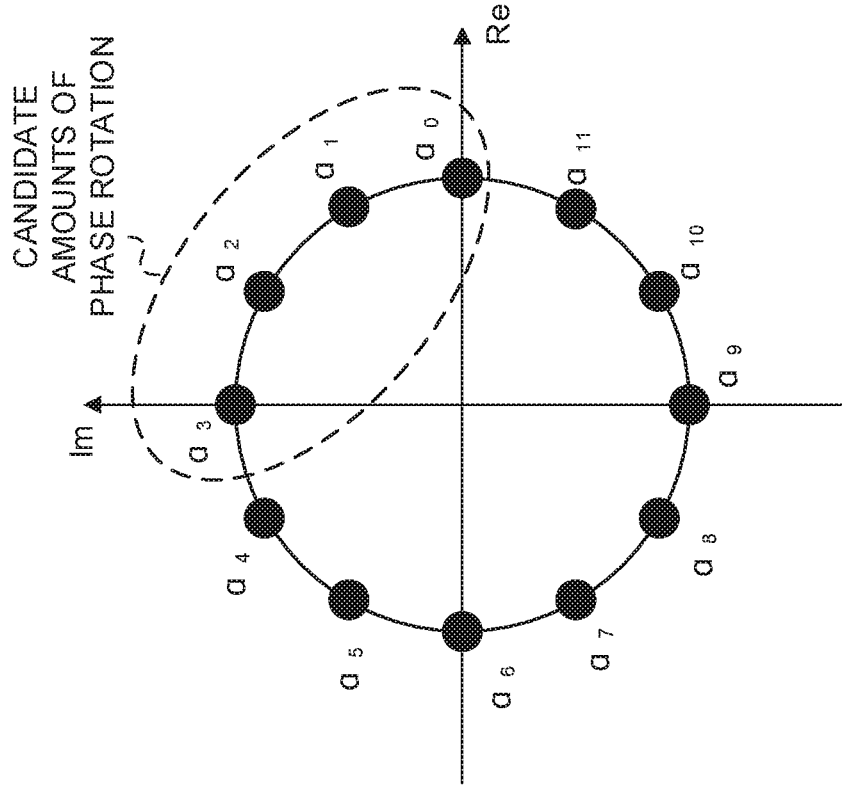
FIGS. 24A and 24B are diagrams to show sets of amounts of phase rotation for a DMRS-based PUCCH and a sequence-based PUCCH in the event two-bit UCI is reported.
Figure 24A:
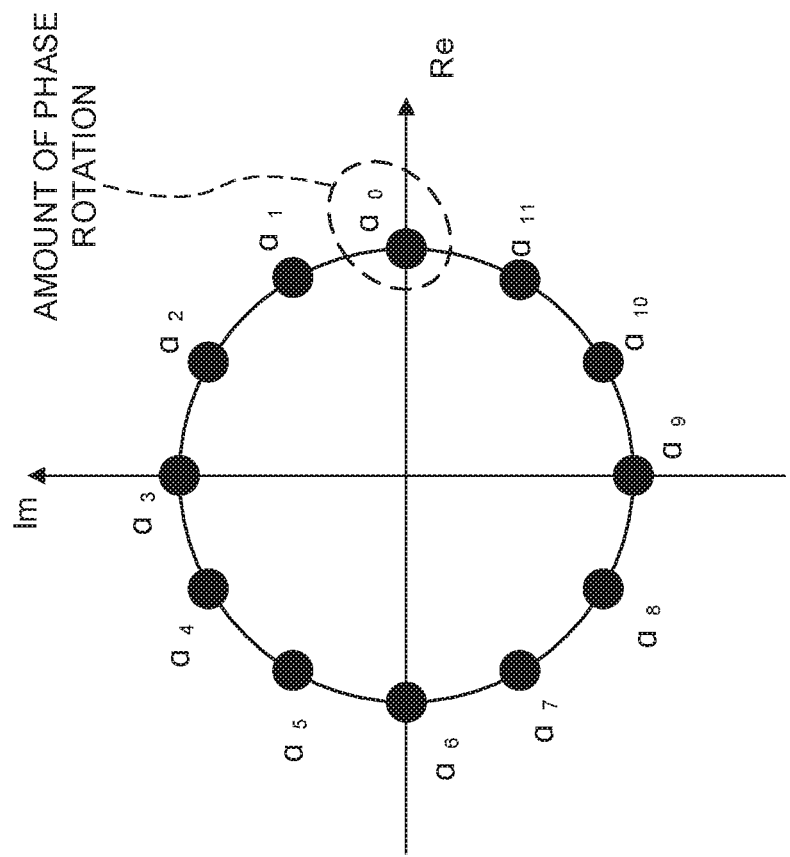

FIG. 24 are diagrams to show sets of amounts of phase rotation for a DMRS-based PUCCH and a sequence-based PUCCH in the event two-bit UCI is reported. The DMRS-based PUCCH uses only one amount of phase rotation, as shown in FIG. 24A. Meanwhile, the sequence-based PUCCH uses four amounts of phase rotation, as shown in FIG. 24B. That is, when two-bit UCI is reported, the number of amounts of phase rotation used for a sequence-based PUCCH is four times the number of amounts of phase rotation used for a DMRS-based PUCCH. However, provided that a sequence-based PUCCH can reduce the time/frequency resources for two-bit UCI to ½ compared to a DMRS-based PUCCH, the maximum number of UEs that can be multiplexed on the sequence-based PUCCH is ½ of the maximum number of UEs that can be multiplexed on the DMRS-based PUCCH.

A case of reporting four-bit UCI will be explained below.

Figures 25A, 25B:
FIGS. 25A and 25B are diagrams to show the formats of an FDM DMRS-based PUCCH and a sequence-based PUCCH in the event four-bit UCI is reported.

FIG. 25 are diagrams to show the formats of an FDM DMRS-based PUCCH and a sequence-based PUCCH in the event four-bit UCI is reported. In the FDM DMRS-based PUCCH shown in FIG. 25A, a DMRS and four-bit UCI are frequency-division-multiplexed (FDM) using two symbols and two PRBs. The sequence-based PUCCH shown in FIG. 25B reports four-bit UCI using two symbols and one PRB. The BER performance of an FDM DMRS-based PUCCH comprised of two PRBs like this is the same as the BER performance of a sequence-based PUCCH comprised of one PRB. In other words, when four-bit UCI is reported, a sequence-based PUCCH can reduce the time/frequency resources to ¼ compared to a DMRS-based PUCCH, to achieve the same BER performance.

Assuming the one-PRB CAZAC sequences of LTE are used as base sequences, thirty different base sequences can be used. If multiplexing of UEs is not taken into account, maximum 360 (30×12) combinations of base sequences and amounts of phase rotation can be used on a per PRB basis.

Figure 26B:
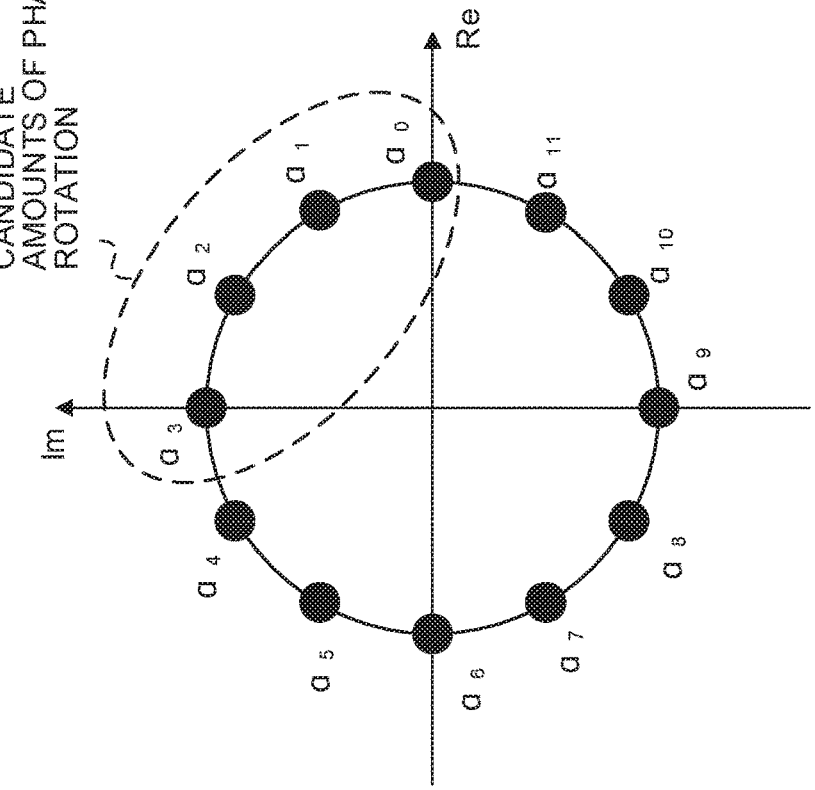
FIGS. 26A and 26B are diagrams to show spreading code resources for sequence-based PUCCHs in the event four-bit UCI is reported.
Figure 26A:
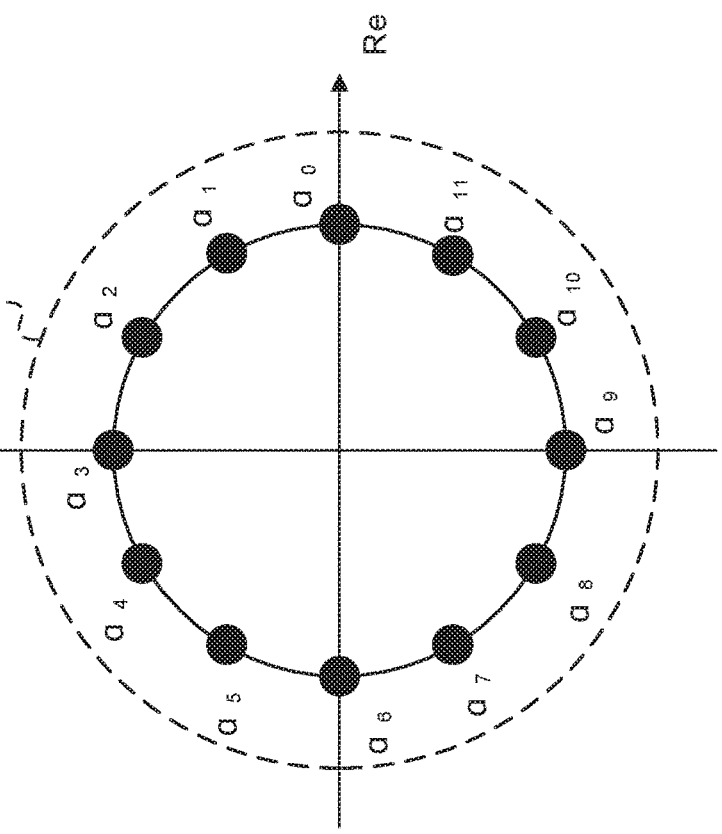

A DMRS-based PUCCH uses only one amount of phase rotation as shown in FIG. 24A. FIG. 26 are diagrams to show spreading code resources for a sequence-based PUCCH in the event four-bit UCI is reported. The sequence-based PUCCH of this example uses spreading code resources in sixteen candidate patterns, including twelve patterns, in which the base sequence of sequence index (n) shown in FIG. 26A is combined with each of amounts of phase rotation $\alpha_0$ to $\alpha_{11}$, and four patterns, in which the base sequence of sequence index (N+1) shown in FIG. 26B is combined with each of amounts of phase rotation $\alpha_0$ to $\alpha_3$. That is, UCI comprise of four bits is reported, the number of amounts of phase rotation used by a sequence-based PUCCH is sixteen times the number of amounts of phase rotation used by a DMRS-based PUCCH. However, provided that a sequence-based PUCCH can reduce the time/frequency resources for two-bit UCI to ¼ compared to a DMRS-based PUCCH, the maximum number of UEs that can be multiplexed on the sequence-based PUCCH is ¼ of the maximum number of UEs that can be multiplexed on the DIMS-based PUCCH.

Note that, compared to the BER performance of a sequence-based PUCCH that reports one bit or two bits of UCI, the BER performance of a sequence-based PUCCH that reports UCI consisting of a larger number of bits than that is nearly equal.

Radio Communication System

Now, the structure of the radio communication system according to one embodiment of the present invention will be described below. In this radio communication system, communication is performed using one or a combination of the radio communication methods according to the herein-contained embodiments of the present invention.

Figure 27:
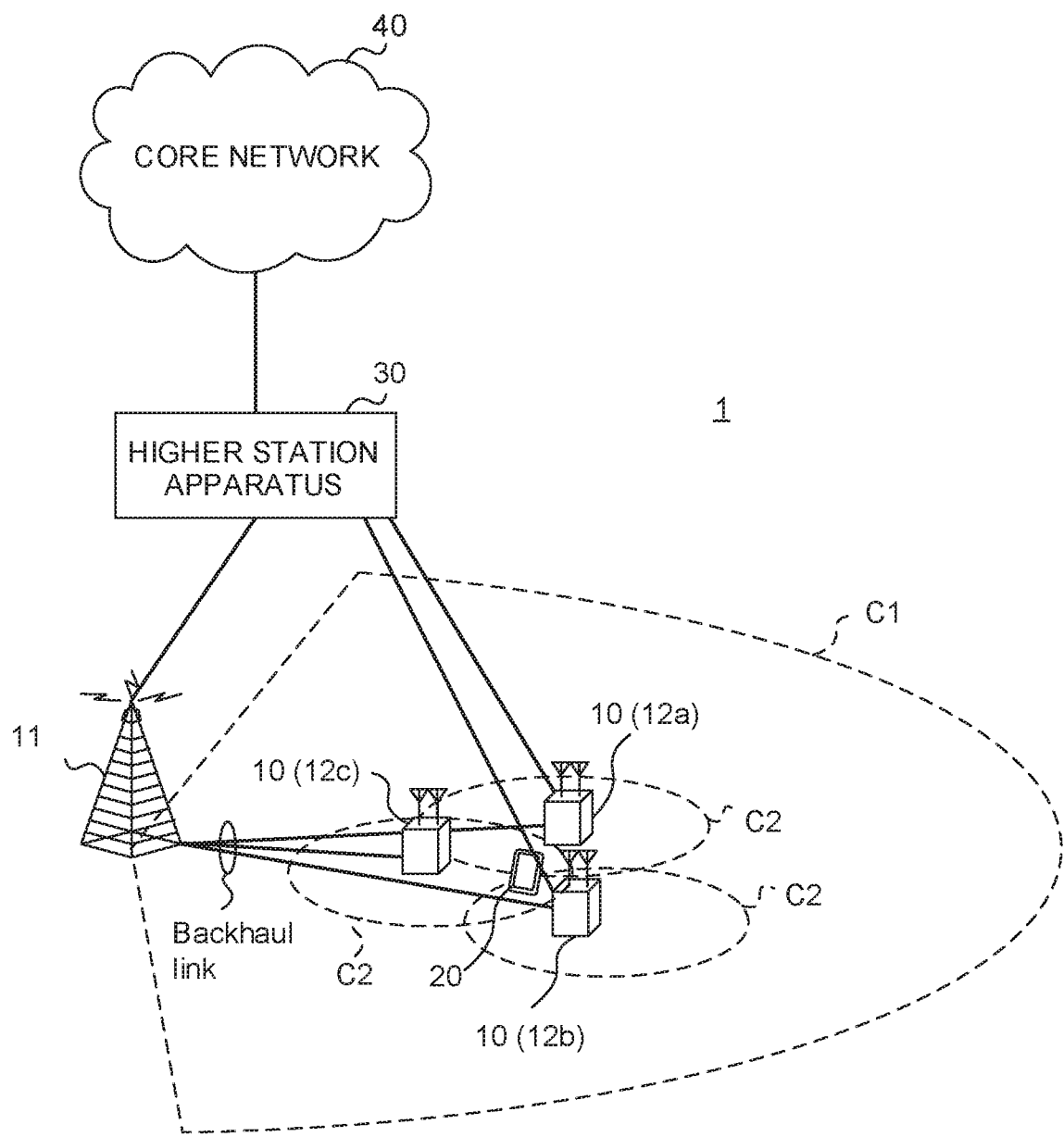
FIG. 27 is a diagram to show an example of a schematic structure of a radio communication system according to one embodiment of the present invention.

FIG. 27 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 1).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that uplink and downlink radio access schemes are not limited to the combination of these, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MW (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported via DCI. For example, DCI to schedule receipt of DL data may be referred to as "DL assignment," and DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

Radio Base Station

Figure 28:
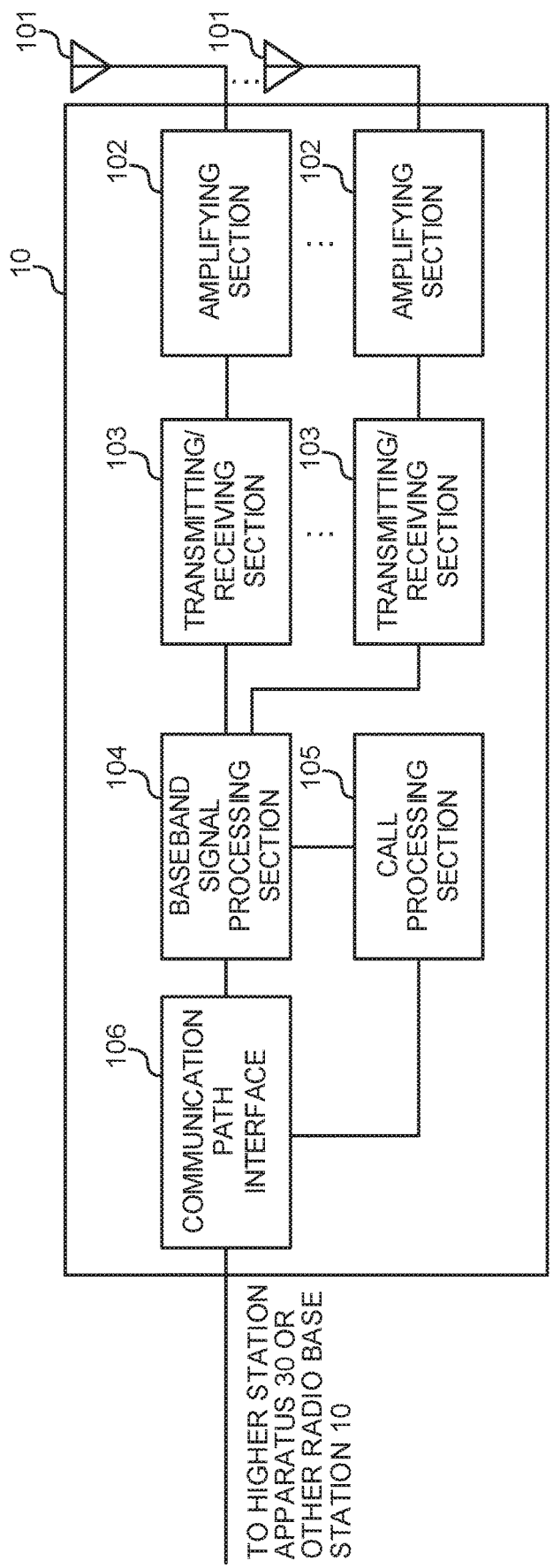
FIG. 28 is a diagram to show an example of an overall structure of a radio base station according to one embodiment of the present invention.

FIG. 28 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Furthermore, the transmitting/receiving sections 103 may transmit information that associates a plurality of candidate values of UL control information (for example, UCI) with a plurality of candidate spreading code resources (for example, at least one of base sequences, amounts of phase rotation, and OCCs), respectively. Also, the transmitting/receiving sections 103 may transmit information that associates a plurality of candidate values of UI, control information with a plurality of candidate amounts of phase rotation and/or base sequences, respectively.

Figure 29:
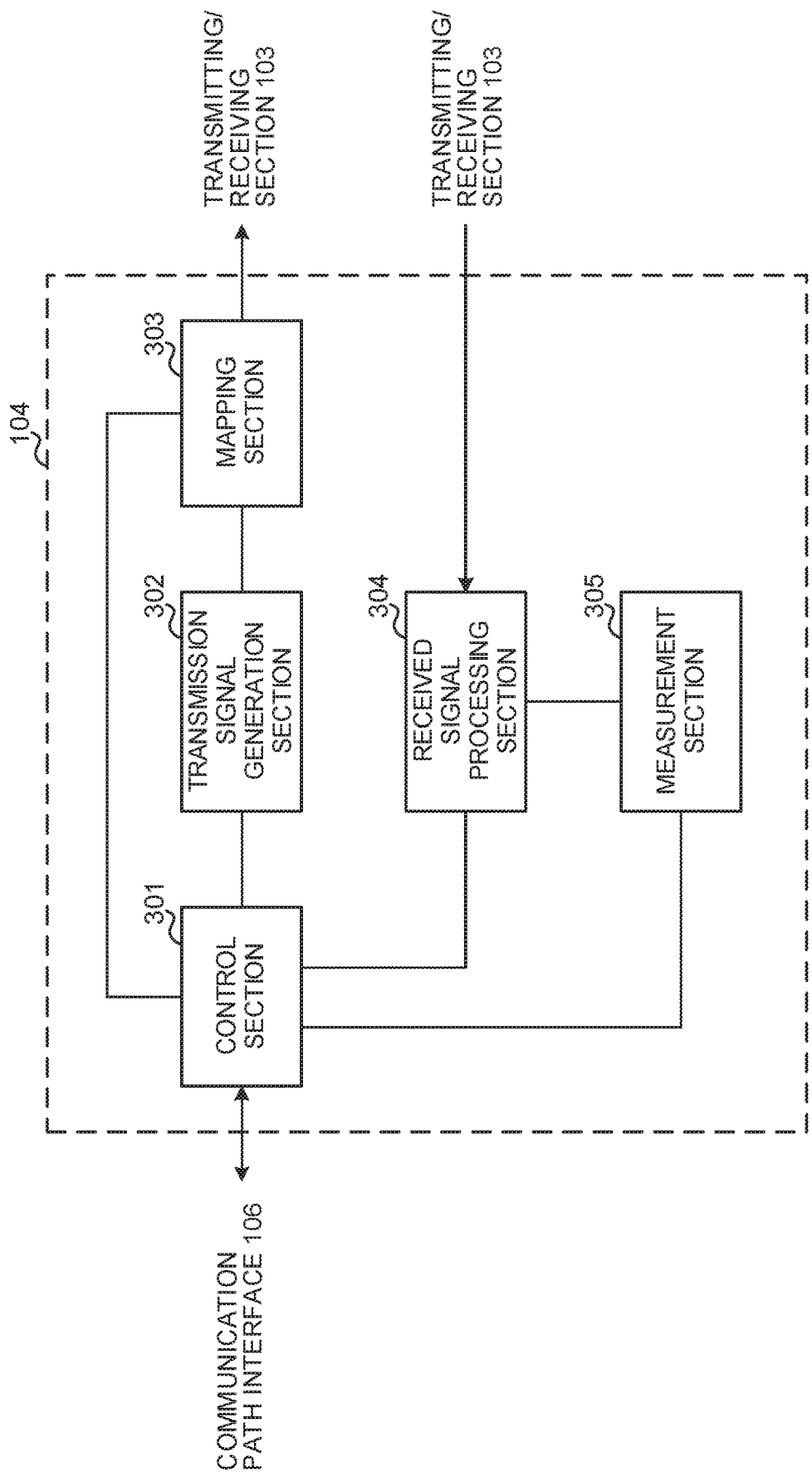
FIG. 29 is a diagram to show an example of a functional structure of a radio base station according to one embodiment of the present invention.

FIG. 29 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and/or other signals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received. Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

In addition, the control section 301 may control assignment of resources for reporting UL control information to the user terminals 20. Also, when allocating resources for reporting UL control information to a plurality of user terminals 20, the control section 301 may allocate resources that are orthogonal to each other, to these user terminals 20.

Furthermore, the control section 301 may identifying the UL control information based on the processing result in the received signal processing section 304, or identify the UL control information that is associated with the time resource and/or the frequency resource based on the measurement result (for example, the measurement result of received power) acquired from the measurement section 305.

User Terminal

Figure 30:
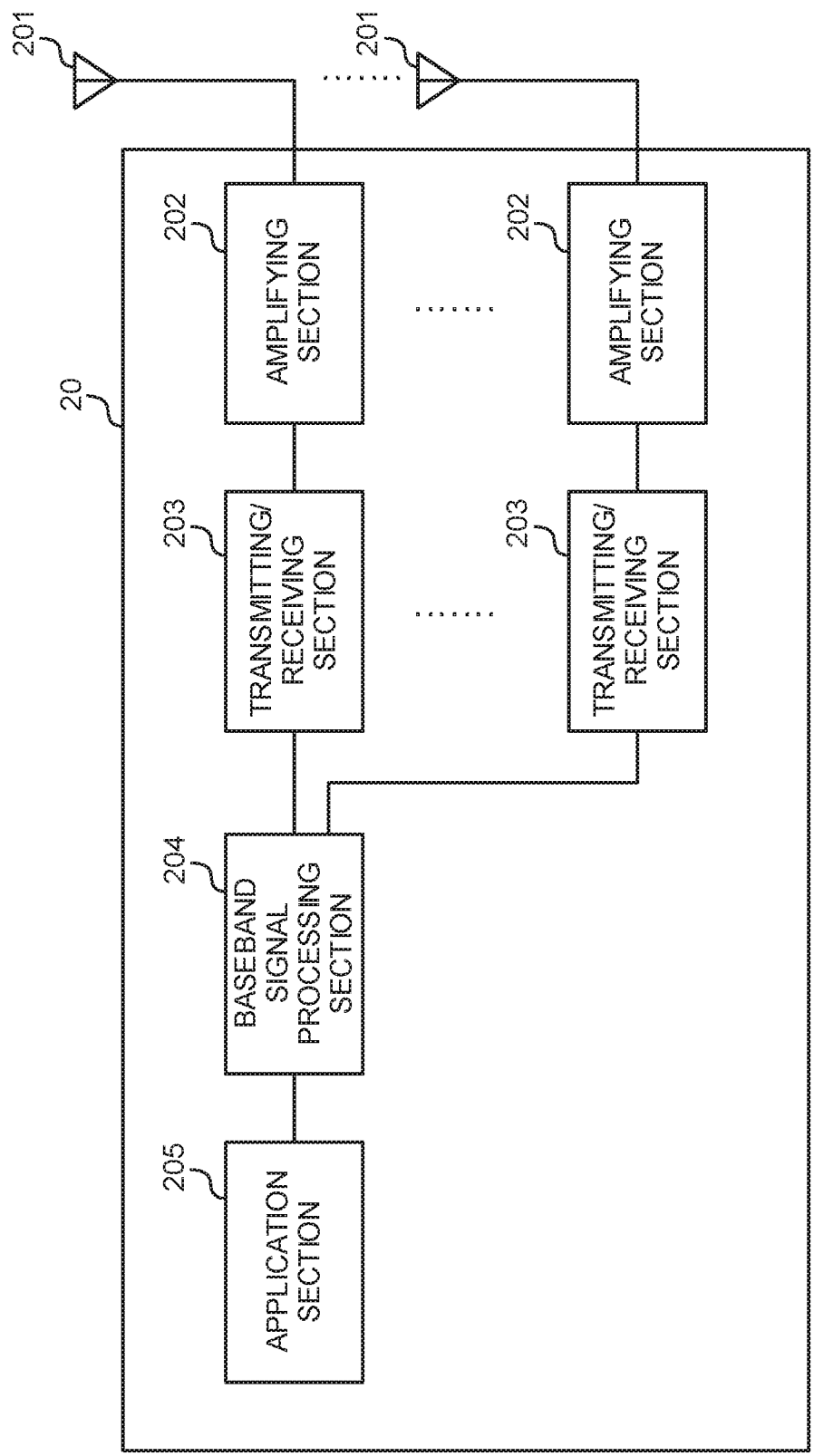
FIG. 30 is a diagram to show an example of an overall structure of a user terminal according to one embodiment of the present invention.

FIG. 30 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency hand in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 may receive information that associates a plurality of candidate values of UL control information with a plurality of candidate spreading code resources, respectively.

Also, the transmitting/receiving section 203 may receive information that associates a plurality of candidate values of UL control information with a plurality of candidate amounts of phase rotation and/or base sequences, respectively.

Furthermore, the transmitting/receiving sections 203 may receive information that associates a plurality of candidate values of UL control information with a plurality of candidate time resources and/or frequency resources, respectively.

Figure 31:
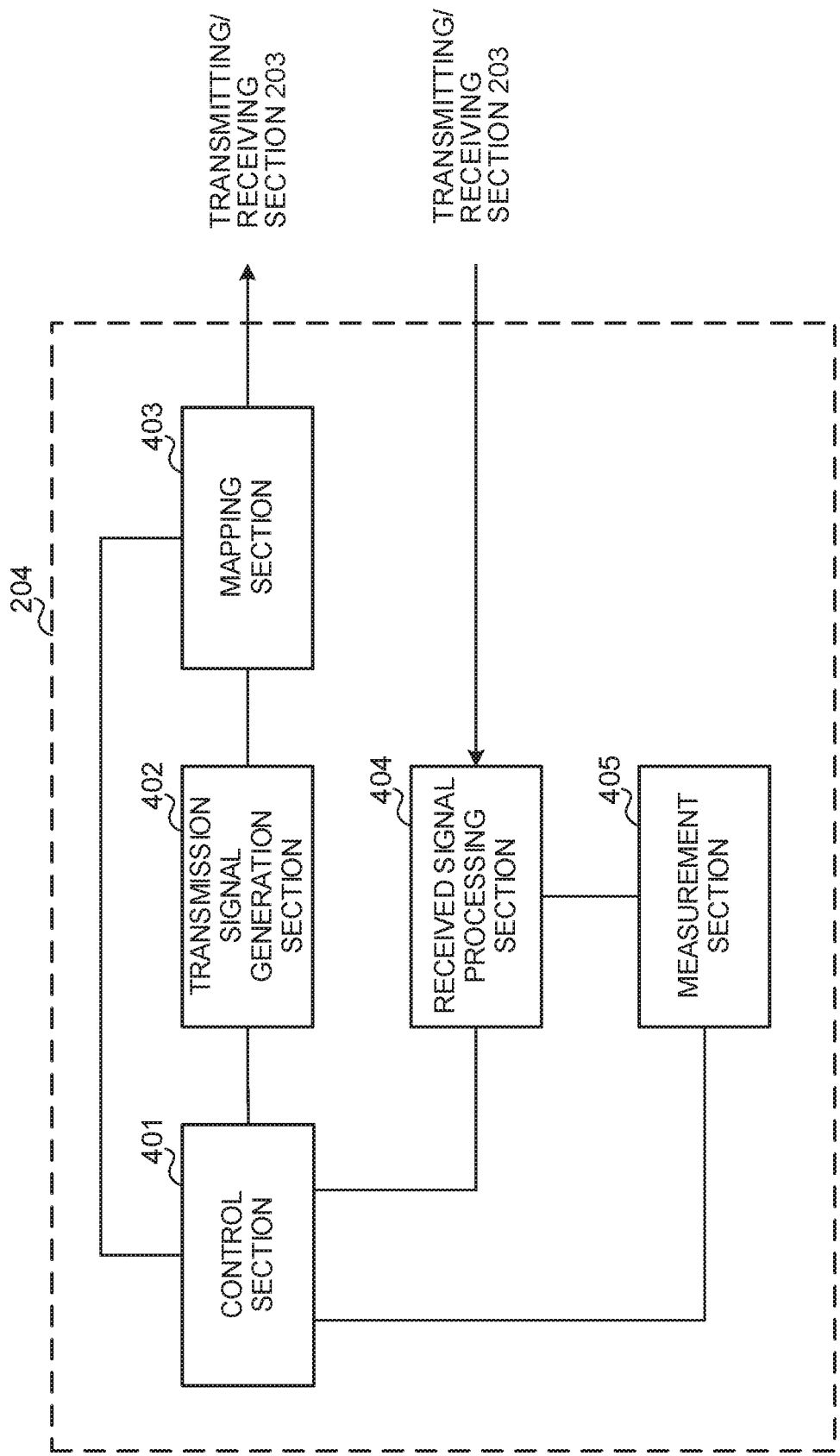
FIG. 31 is a diagram to show an example of a functional structure of a user terminal according to one embodiment of the present invention.

FIG. 31 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SIR, etc.), the signal strength (for example, RSSI), transmission path information (for example, CSI), and so on. The measurement results may be output to the control section 401.

Furthermore, the control section 401 may control mapping of a UL signal that is generated by using a spreading code resource that is associated with a value of UL control information, to a plurality of time resources (for example, a plurality of symbols).

Also, the control section 401 may control frequency hopping of the UL signal among the plurality of time resources.

Furthermore, the control section 401 may control generation of the UL signal by using an amount of phase rotation and/or a base sequence that is associated with the value of the UL control information among a plurality of candidates of amounts of phase rotation and/or base sequences based on information that associates a plurality of candidate values for the UL control information with a plurality of candidates of amounts of phase rotation and/or base sequences, respectively.

Furthermore, these multiple candidates may be each a combination of at least one of a base sequence, a time resource, and a frequency resource, with an amount of phase rotation. The control section 401 may control generation of the UL signal by using the combination corresponding to the value of the UL control information among the multiple candidates.

Furthermore, these multiple candidates may vary per user terminal.

Also, when another UL signal containing a reference signal is transmitted from another user terminal, the control section 401 may control code-division-multiplexing of the generated UL signal to the reference signal and transmission of the multiplexed signals.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 32:
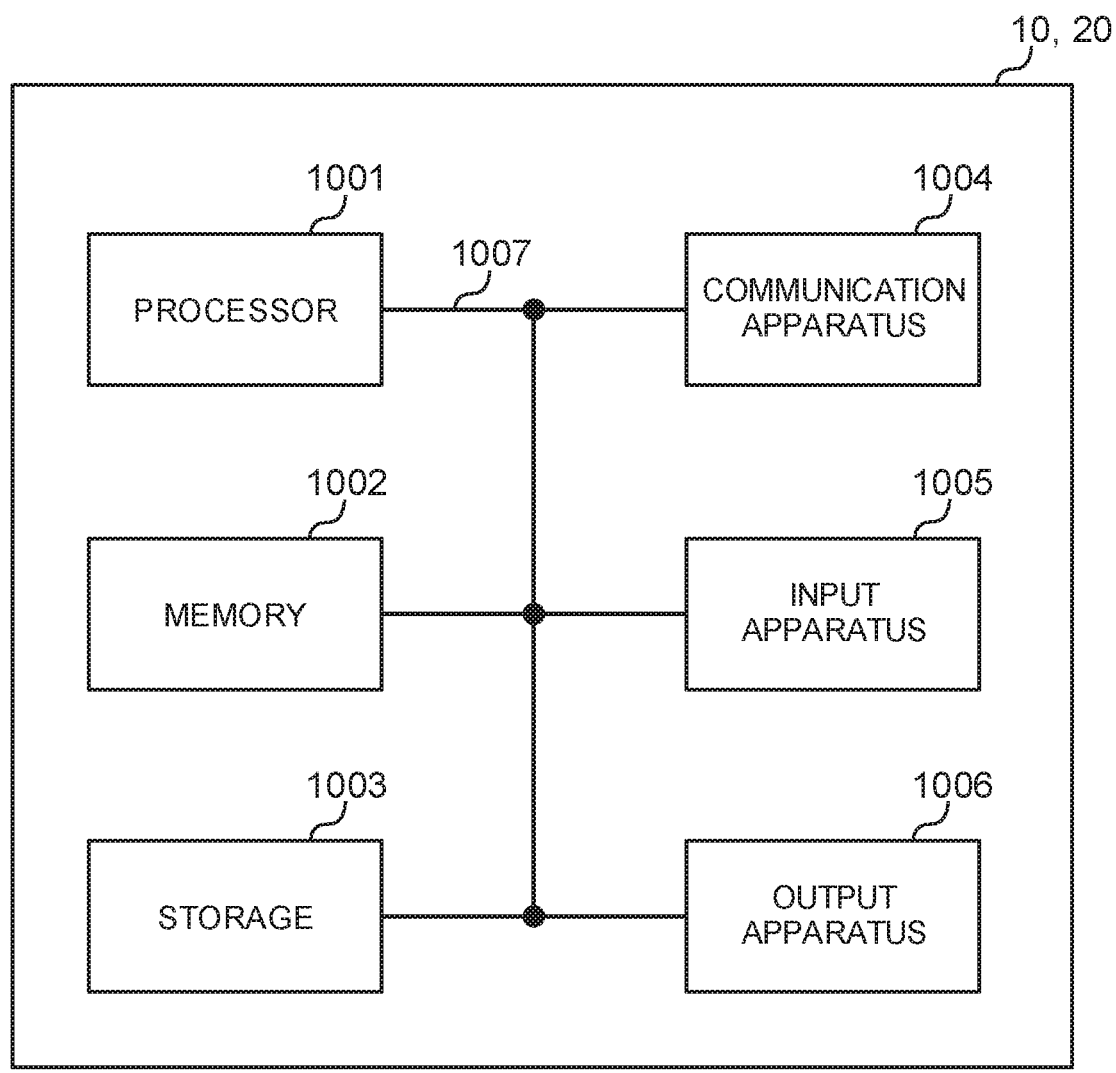
FIG. 32 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 32 is a diagram to show an example hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini slots. Each mini-slot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms, Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of mini slots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification ay be represented in absolute values or in relative values with respect to given values, or may be represented in other information formats. For example, radio resources may be specified by given indices. In addition, equations to use these parameters and so on may be different from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly for example, not reporting this piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017975, filed on Feb. 2, 2017, including the specification, drawings and abstract, is incorporated herein by reference in its entirety.

The invention claimed is:

1. A terminal comprising:
   a transmitter that transmits uplink control information on an uplink control channel; and
   a processor that uses, for the transmission of the uplink control information, one of uplink control channel formats including a first uplink control channel format and a second uplink control channel format, based on a number of bits of the uplink control information,
   wherein when the processor uses the first uplink channel control format, the processor maps a sequence based on a cyclic shift depending on the uplink control information within resources that are assigned to the uplink control channel and does not map a demodulation reference signal within the resources, and
   wherein when the processor uses the second uplink channel control format, the processor maps the uplink control information and a demodulation reference signal within resources that are assigned to the uplink control channel, wherein when a duration of the uplink control channel with the first uplink control channel format is two symbols, the processor maps two sequences to the two symbols respectively, the two sequences are based on two cyclic shifts respectively, and each of the two cyclic shifts is based on a same value of the uplink control information, wherein when the number of bits is less than or equal to a certain number, the processor uses the first uplink control channel format; and when the number of bits is greater than the certain number, the processor uses the second uplink control channel format, and wherein if the uplink control information transmitted using the first uplink control channel format comprises 2 Hybrid Automatic Repeat reQuest-Acknowledge (HARQ-ACK) bits, then an interval between each of four cyclic shifts, respectively based on four values of the 2 HARQ-ACK bits, is $\pi/2$.

2. The terminal according to claim 1, wherein the uplink control information, which is transmitted using the first uplink control channel format, is transmitted over 1 or 2 symbols, and the number of bits of the uplink control information is 2.

3. The terminal according to claim 2, wherein the processor applies frequency hopping on the uplink control channel.

4. The terminal according to claim 1, wherein the processor applies frequency hopping on the uplink control channel.

5. The terminal according to claim 1, wherein the terminal further comprises a receiver that receives a higher layer signaling indicating relation of cyclic shifts and values of the uplink control information, and the processor determines the cyclic shift based on the higher layer signaling and a value of the uplink control information.

6. A radio communication method for a terminal comprising:

transmitting uplink control information on an uplink control channel; and using, for the transmission of the uplink control information, one of uplink control channel formats including a first uplink control channel format and a second uplink control channel format, based on a number of bits of the uplink control information, wherein when the terminal uses the first uplink channel control format, the processor maps a sequence based on a cyclic shift depending on the uplink control information within resources that are assigned to the uplink control channel and does not map a demodulation reference signal within the resources, and wherein when the terminal uses the second uplink channel control format, the processor maps the uplink control information and a demodulation reference signal within resources that are assigned to the uplink control channel, wherein when a duration of the uplink control channel with the first uplink control channel format is two symbols, the terminal maps two sequences to the two symbols and each of the two sequences are based on the uplink control information, wherein when the number of bits is less than or equal to a certain number, the terminal uses the first uplink control channel format; and when the number of bits is greater than the certain number, the terminal uses the second uplink control channel format, and wherein if the uplink control information transmitted using the first uplink control channel format comprises 2 Hybrid Automatic Repeat reQuest-Acknowledge (HARQ-ACK) bits, then an interval between each of four cyclic shifts, respectively based on four values of the 2 HARQ-ACK bits, is $\pi/2$.

7. A system comprising a terminal and a base station, wherein the terminal comprises:

a transmitter that transmits uplink control information on an uplink control channel; and a processor that uses, for the transmission of the uplink control information, one of uplink control channel formats including a first uplink control channel format and a second uplink control channel format, based on a number of bits of the uplink control information, the base station receives the uplink control information on the uplink control channel, when the processor uses the first uplink channel control format, the processor maps a sequence based on a cyclic shift depending on the uplink control information within resources that are assigned to the uplink control channel and does not map a demodulation reference signal within the resources, and wherein when the processor uses the second uplink channel control format, the processor maps the uplink control information and a demodulation reference signal within resources that are assigned to the uplink control channel, when a duration of the uplink control channel with the first uplink control channel format is two symbols, the processor maps two sequences to the two symbols respectively, the two sequences are based on two cyclic shifts respectively, and each of the two cyclic shifts is based on a same value of the uplink control information, when the number of bits is less than or equal to a certain number, the processor uses the first uplink control channel format; and when the number of bits is greater than the certain number, the processor uses the second uplink control channel format, and wherein if the uplink control information transmitted using the first uplink control channel format comprises 2 Hybrid Automatic Repeat reQuest-Acknowledge (HARQ-ACK) bits, then an interval between each of four cyclic shifts, respectively based on four values of the 2 HARQ-ACK bits, is $\pi/2$.

* * * * *